(12) United States Patent
Imamura

(10) Patent No.: US 11,137,725 B2
(45) Date of Patent: Oct. 5, 2021

(54) ELECTRONIC DEVICE, NON-TRANSITORY COMPUTER-READABLE RECORDING MEDIUM STORING PROGRAM, AND INFORMATION REPORT METHOD

(71) Applicant: CASIO COMPUTER CO., LTD., Tokyo (JP)

(72) Inventor: Keiichi Imamura, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 727 days.

(21) Appl. No.: 15/721,564

(22) Filed: Sep. 29, 2017

(65) Prior Publication Data

US 2018/0181080 A1    Jun. 28, 2018

(30) Foreign Application Priority Data

Dec. 27, 2016 (JP) .............................. JP2016-252651
May 26, 2017 (JP) .............................. JP2017-104952

(51) Int. Cl.

| G01C 21/36 | (2006.01) |
|---|---|
| G01C 21/34 | (2006.01) |
| G04G 21/00 | (2010.01) |
| G01S 19/42 | (2010.01) |
| G04G 99/00 | (2010.01) |

(Continued)

(52) U.S. Cl.
CPC ............ *G04G 99/006* (2013.01); *G01C 21/34* (2013.01); *G01C 21/3626* (2013.01); *G01S 19/14* (2013.01); *G04G 21/00* (2013.01); *G04G 21/08* (2013.01); *G06F 1/163* (2013.01);

(Continued)

(58) Field of Classification Search
CPC ........ G04G 21/00; G01S 19/42; G01C 21/34; G01C 21/3626
See application file for complete search history.

(56) References Cited

U.S. PATENT DOCUMENTS

| 2011/0046881 | A1 | 2/2011 | Karaoguz | |
|---|---|---|---|---|
| 2013/0326384 | A1* | 12/2013 | Moore | G01C 21/3682 715/771 |
| 2017/0276497 | A1* | 9/2017 | Andrew | G01C 21/3641 |

FOREIGN PATENT DOCUMENTS

| CN | 101998236 A | 3/2011 |
|---|---|---|
| JP | 2000099236 A | 4/2000 |

(Continued)

OTHER PUBLICATIONS http://isuta.jp/category/iphone/2010/05/46541/.

(Continued)

*Primary Examiner* — Matthew Salvucci
(74) *Attorney, Agent, or Firm* — Holtz, Holtz & Volek PC

(57) ABSTRACT

A smartwatch comprises a CPU configured to acquire current location information, acquire map information based on the current location information, select any icon from a plurality of icons associated with predetermined information wherein the plurality of icons are different from each other, add the selected icon to a designated point designated on the map information in response to a user operation, and report predetermined information corresponding to the icon added to the designated point to the user when a predetermined condition for the selected icon is satisfied, and a display unit configured to display additional information added by the CPU and its corresponding designated point together with the map information.

20 Claims, 17 Drawing Sheets

(51) Int. Cl.
    *G06F 1/16* (2006.01)
    *G04G 21/08* (2010.01)
    *G01S 19/14* (2010.01)
    *G06F 3/0488* (2013.01)
    *G06F 3/0485* (2013.01)

(52) U.S. Cl.
    CPC ........ *G06F 3/0485* (2013.01); *G06F 3/04883* (2013.01); *G01S 19/42* (2013.01)

(56) References Cited

FOREIGN PATENT DOCUMENTS

| | | | |
|---|---|---|---|
| JP | 2003166843 A | 6/2003 | |
| JP | 2003279366 A | 10/2003 | |
| JP | 2011022077 A | 2/2011 | |
| JP | 2011209576 A | 10/2011 | |

OTHER PUBLICATIONS http://andronavi.com/2010/01/5473.
http://www.appbank.net/2011/02/09/iphone-application/218744.php.
Chinese Office Action dated Oct. 9, 2019 (and English translation thereof) issued in Chinese Application No. 201711125262.0.
Japanese Office Action (and English language translation thereof) dated Dec. 3, 2019 issued in Japanese Application No. 2017-104952.
Services for introducing a spot of "SNS external to the public" on the map on a map of "SNAPLACE", May 19, 2019, https://internet.watch.impress.co.jp/docs/column/chizu/757786.html.
Simple! Multifunction! Practical!, Free cloud without use, Nikkei PC, Feb. 21, 2014, Japan, Nikkei's BP, Dec. 24, 2013, vol. 19, No. 3, vol. 364, pp. 82.
English language translation of "Services for introducing a spot of "SNS external to the public" on the map on a map of "SNAPLACE", May 19, 2019, https://internet.watch.impress.co.jp/docs/column/chizu/757786.html".
English language translation of "Simple! Multifunction! Practical!, Free cloud without use, Nikkei PC, Feb. 21, 2014, Japan, Nikkei's BP, Dec. 24, 2013, vol. 19, No. 3, vol. 364, pp. 82".

* cited by examiner

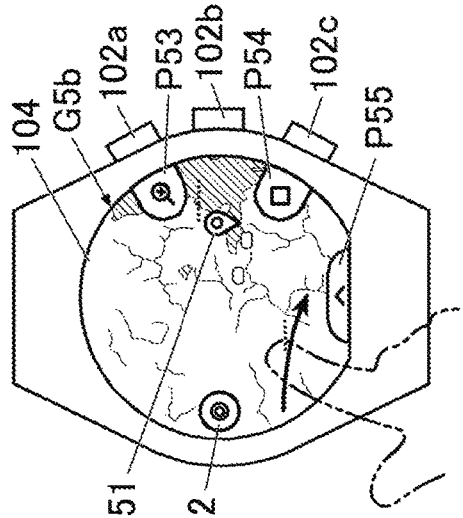
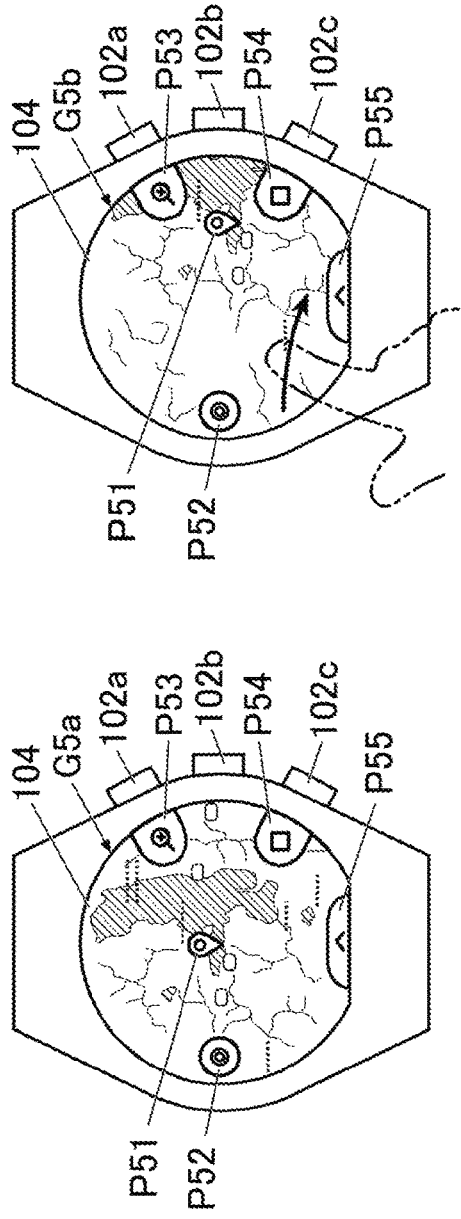
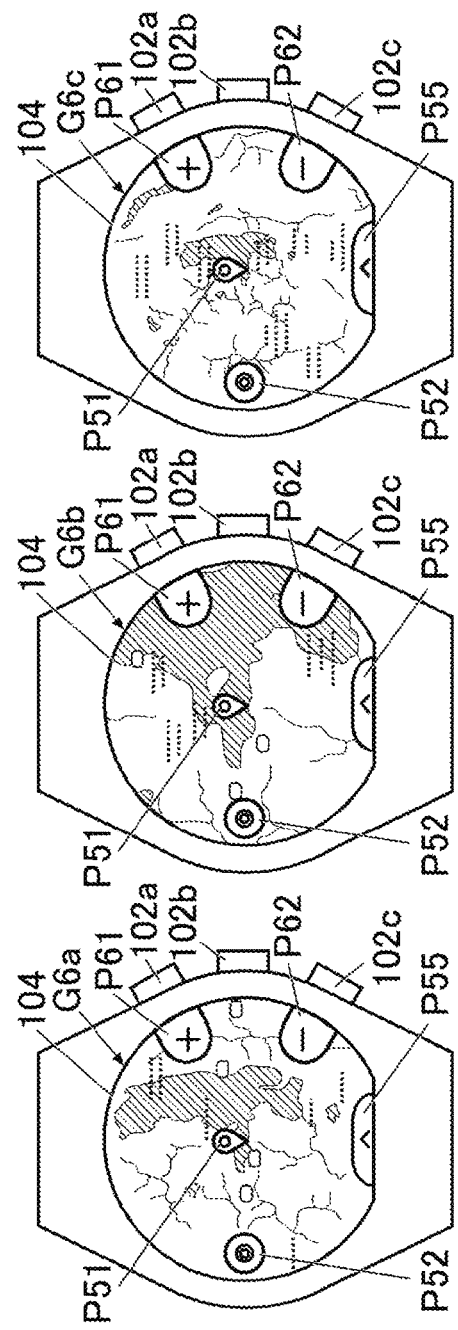

ELECTRONIC DEVICE, NON-TRANSITORY COMPUTER-READABLE RECORDING MEDIUM STORING PROGRAM, AND INFORMATION REPORT METHOD

CROSS-REFERENCE TO RELATED APPLICATIONS

This application is based upon and claims the benefit of priority under 35 USC 119 of Japanese Patent Application No. 2016-252651 filed on Dec. 27 2016 and Japanese Patent Application No. 2017-104952 filed on May 26 2017, the entire disclosure of which, including the description, claims, drawings, and abstract, is incorporated herein by reference in its entirety.

BACKGROUND OF THE INVENTION

1. Field of the Invention

The present invention relates to an electronic device, a non-transitory computer-readable recording medium storing a program, and an information report method.

2. Description of the Related Art

There have been conventionally provided various products and services and the like using location information or map information in portable (or wearable) electronic devices such as cell phone, smartphone, tablet terminal, navigation terminal, and sports watch.

For the electronic devices, according to JP 2011-209576 A, there is provided a technique for adding information on a specific point to the specific point on map information displayed on an electronic device on the basis of a user operation, for example.

BRIEF SUMMARY OF THE INVENTION

1. An electronic device comprising a processor configured to:
  acquire current location information;
  acquire map information based on the current location information
  select any additional information from among a plurality of items of additional information associated with predetermined information, wherein the plurality of items of additional information are different from each other;
  add the additional information to a designated point designated on the map information by the current location information;
  display the additional information and the corresponding designated point together with the map information; and
  report predetermined information corresponding to the additional information added to the designated point to a user when a predetermined condition for the additional information is satisfied.
19. A non-transitory computer-readable recording medium storing a program for causing a computer, when executed on a processor, to function as:
  acquire current location information;
  acquire map information based on the current location information
  select any additional information from among a plurality of items of additional information associated with predetermined information, wherein the plurality of items of additional information are different from each other;
  add the additional information to a designated point designated on the map information by the current location information;
  display the additional information and the corresponding designated point together with the map information; and
  report predetermined information corresponding to the additional information added to the designated point to a user when a predetermined condition for the additional information is satisfied.
20. An information report method performed by a processor of an electronic device, the method comprising the steps of:
  acquiring current location information;
  acquiring map information based on the current location information
  selecting any additional information from among a plurality of items of additional information associated with predetermined information, wherein the plurality of items of additional information are different from each other;
  adding the additional information to a designated point designated on the map information by the current location information; and
  reporting predetermined information corresponding to the additional information added to the designated point to a user when a predetermined condition for the additional information is satisfied.

BRIEF DESCRIPTION OF THE SEVERAL VIEWS OF THE DRAWING

FIGS. 5A and 5B are diagrams illustrating exemplary screens displayed when a user browses map information;

FIGS. 6A to 6C are diagrams illustrating exemplary screens displayed when map information is enlarged or reduced;

DETAILED DESCRIPTION OF THE INVENTION

Embodiments of the present invention will be explained with reference to the drawings.

An embodiment of the present invention will be described below with reference to the drawings. The following embodiment is given various technically-preferable limitations for attaining the present invention, but the scope of the present invention is not limited to the following embodiment and illustrated examples.

<<Configuration of Map Information Display System 100>>

Figure 1:
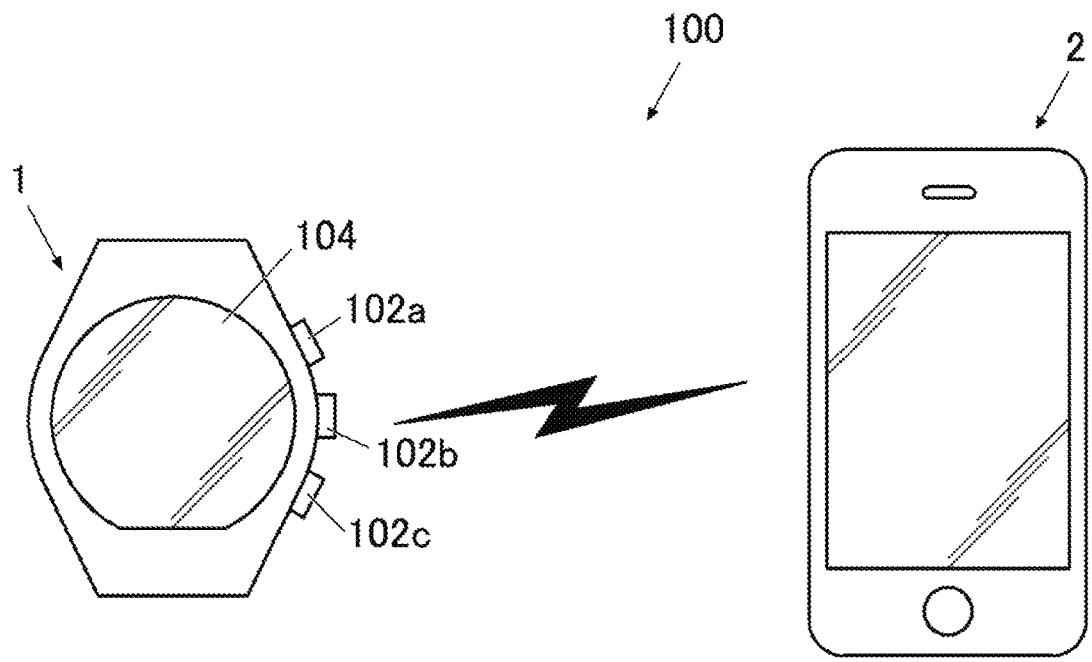
FIG. 1 is a schematic configuration diagram illustrating a map information display system according to an embodiment.

A configuration of the present embodiment will be first described with reference to FIG. 1. FIG. 1 is a schematic configuration diagram of a map information display system 100 according to the present embodiment.

The map information display system 100 according to the present embodiment is directed for adding a selected icon (addition information) onto map information displayed on the screen of an electronic device, and reporting the information corresponding to the icon to a user when a predetermined condition is satisfied.

As illustrated in FIG. 1, the map information display system 100 comprises a smartwatch (electronic device) 1 and a smartphone 2, and the devices are communicably connected to each other. According to the present embodiment, the configuration with the smartphone 2 is assumed, but the configuration is not limited thereto. That is, a user terminal such as tablet terminal, navigation terminal or personal computer (PC), or a server may be provided instead of or in addition to the smartphone 2.

<<Configuration of Smartwatch 1>>

Figure 2:
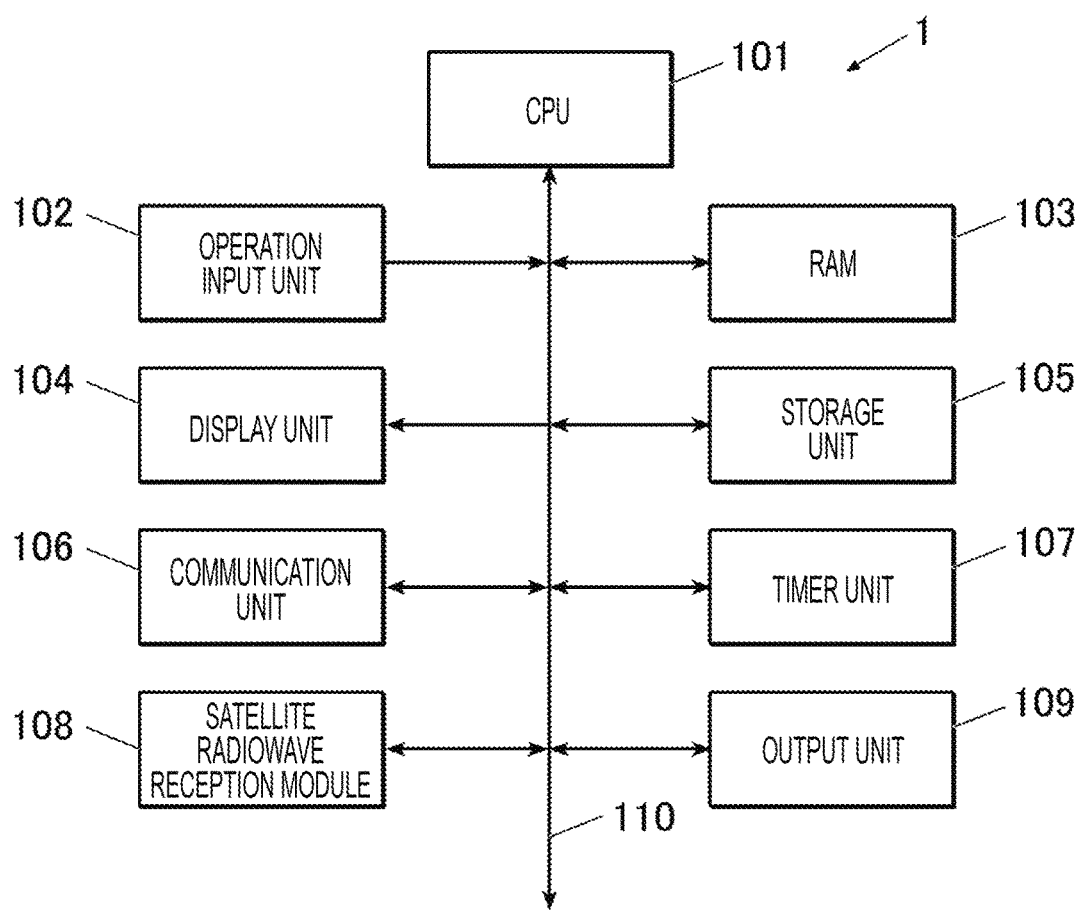
FIG. 2 is a block diagram illustrating a functional configuration of a smartwatch.

An internal configuration of the smartwatch 1 will be described below. FIG. 2 illustrates the internal configuration of the smartwatch 1.

As illustrated in FIG. 2, the smartwatch 1 comprises a central processing unit (CPU) 101, an operation input unit 102, a random access memory (RAM) 103, a display unit 104, a storage unit 105, a communication unit 106, a timer unit 107, a satellite radiowave reception module 108, and an output unit 109, and the units are connected via a bus 110.

The CPU 101 reads and develops a system program stored in the storage unit 105 into a work area in the RAM 103 thereby to control each unit according to the system program. The CPU 101 reads and develops processing programs stored in the storage unit 105 into the work area thereby to perform various processings including the processings of the smartwatch 1 such as map information display processing, icon addition processing, and report processing, and functions as a location information acquisition unit, a map information acquisition unit, a selection unit, an information addition unit, a report unit, a map information display control unit, a navigation unit, an additional information display control unit, a presentation unit, a feeling information acquisition unit, a control unit, a character string display control unit, and a communication control unit.

The operation input unit 102 is configured of press button switches 102a to 102c, a touch sensor provided on the display unit 104 or the like, converts operation contents into an electric signal in response to a user input operation, and outputs the electric signal to the CPU 101. The operation input unit 102 includes a speech input unit (not illustrated) configured of a microphone or the like, converts user-input speech into an electric signal, and outputs the electric signal to the CPU 101. Thus, the operation input unit 102 functions as an interface provision unit configured to provide a user with an interface for inputting memo information described below.

The RAM 103 is a volatile memory. The RAM 103 has a work area for storing various programs to be executed or data on the programs.

The display unit 104 is configured of a liquid crystal display (LCD), cathode ray tube (CRT) or the like, and displays a screen according to a display control signal from the CPU 101. As described above, a touch sensor is provided on the display screen of the display unit 104. Thus, the display unit 104 functions as a display unit configured to display an icon together with map information and an interface provision unit configured to provide a user with an interface for inputting memo information described below.

The storage unit 105 is configured of a hard disk drive (HDD) having a magnetic recording medium, or the like. The storage unit 105 stores therein the system program and the processing programs executed by the CPU 101, application programs such as Web server program, data required for executing the programs and the like. The processing programs include the programs for performing various processings including the processings of the smartwatch 1 such as map information display processing, icon addition processing, and report processing described below.

The programs are stored in the storage unit 105 in a form of computer-readable program code. The CPU 101 sequentially performs the operations according to the program code.

The storage unit 105 stores therein various items of user-input data or various items of data transmitted from the smartphone 2. For example, the storage unit 105 is configured to be able to store a user-added icon, designated point information indicating a designated point added with the icon, time information indicating when the icon is added, user-input memo information, map information displayed on the display unit 104, location history information indicating a history of user's current locations, and the like.

The communication unit 106 controls communication of information with a portable device such as smartphone connected via predetermined wireless communication line (for example, a wireless personal area network (PAN) such as Bluetooth (registered trademark)), or an external device such as PC. The communication unit 106 performs a communication setting processing called pairing in advance, for example, thereby to exchange mutual device information or authentication key data with a communication party via a wireless signal. Thereafter, communication connection is released when the smartwatch 1 and the smartphone 2 are out of the radiowave range and communication connection is automatically made when they are closer to the radiowave range, for example, without the communication setting processing each time.

The timer unit 107 comprises a timer or clock circuit, for example, and counts a current time thereby to acquire time information. The timer unit 107 outputs the acquired time information to the CPU 101.

The satellite radiowave reception module 108 has an antenna (not illustrated), captures, receives and demodulates a radiowave from a positioning satellite in a positioning system such as global positioning system (GPS) thereby to output the acquired current location information or time information to the CPU 101. The satellite radiowave reception module 108 can individually control the power supply to be turned ON/OFF in response to a user operation irrespective of the power supply operation of the entire smartwatch 1.

The output unit 109 is configured of a vibration motor causing vibrations, a speaker or the like, and outputs a vibration or speech on the basis of a signal sent from the CPU 101.

<<Configuration of Smartphone 2>>

Figure 3:
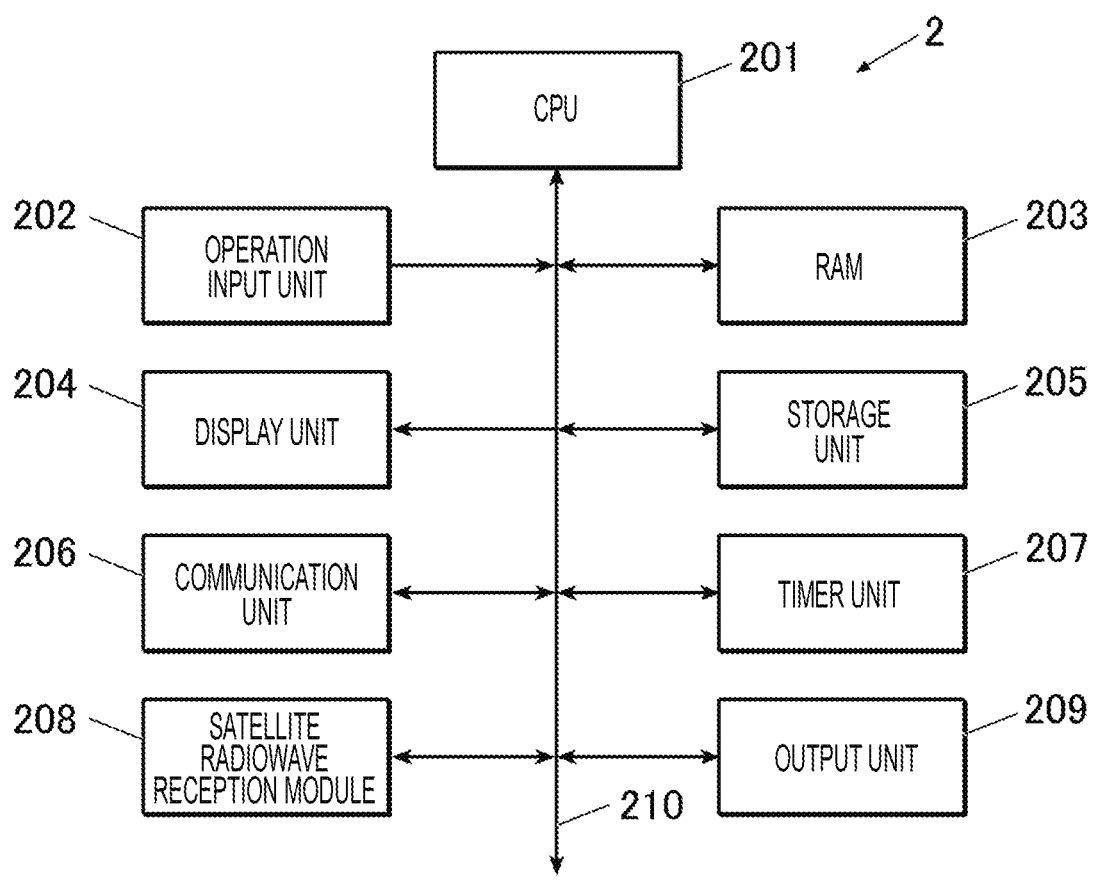
FIG. 3 is a block diagram illustrating a functional configuration of a smartphone.

An internal configuration of the smartphone 2 will be described below. FIG. 3 illustrates the internal configuration of the smartphone 2.

As illustrated in FIG. 3, the smartphone 2 comprises a CPU 201, an operation input unit 202, a RAM 203, a display unit 204, a storage unit 205, a communication unit 206, a timer unit 207, a satellite radiowave reception module 208, and an output unit 209, and the units are connected via a bus 210.

The CPU 201, the operation input unit 202, the RAM 203, the display unit 204, the storage unit 205, the communication unit 206, the timer unit 207, the satellite radiowave reception module 208, and the output unit 209 are similar in their configurations to the CPU 101, the operation input unit 102, the RAM 103, the display unit 104, the storage unit 105, the communication unit 106, the timer unit 107, the satellite radiowave reception module 108, and the output unit 109 in the smartwatch 1, respectively, and thus the differences therebetween will be mainly described.

The CPU 201 reads and develops a system program stored in the storage unit 205 into a work area in the RAM 203 thereby to control each unit according to the system program. The CPU 201 reads and develops processing programs stored in the storage unit 205 into the work area thereby to perform various processings including the processings of the smartphone 2 such as map information display processing and report processing described below.

The storage unit 205 is configured of a HDD having a magnetic recording medium, or the like. The storage unit 205 stores therein the system program and the processing programs executed by the CPU 201, application programs such as Web browser program, data required for executing the programs and the like. The processing programs include programs for performing various processings including the processings of the smartphone 2 such as map information display processing and report processing described below.

The communication unit 206 makes communication with an external device such as the paired smartwatch 1 or a server (not illustrated) on a communication network thereby to exchange data therewith.

<<Operations of Map Information Display System 100>>

Various processings performed by the thus-configured map information display system 100 will be described below. The processings described below assume that both the smartwatch 1 and the smartphone 2 are in a data communicable state.

(Map Information Display Processing)

Figure 4:
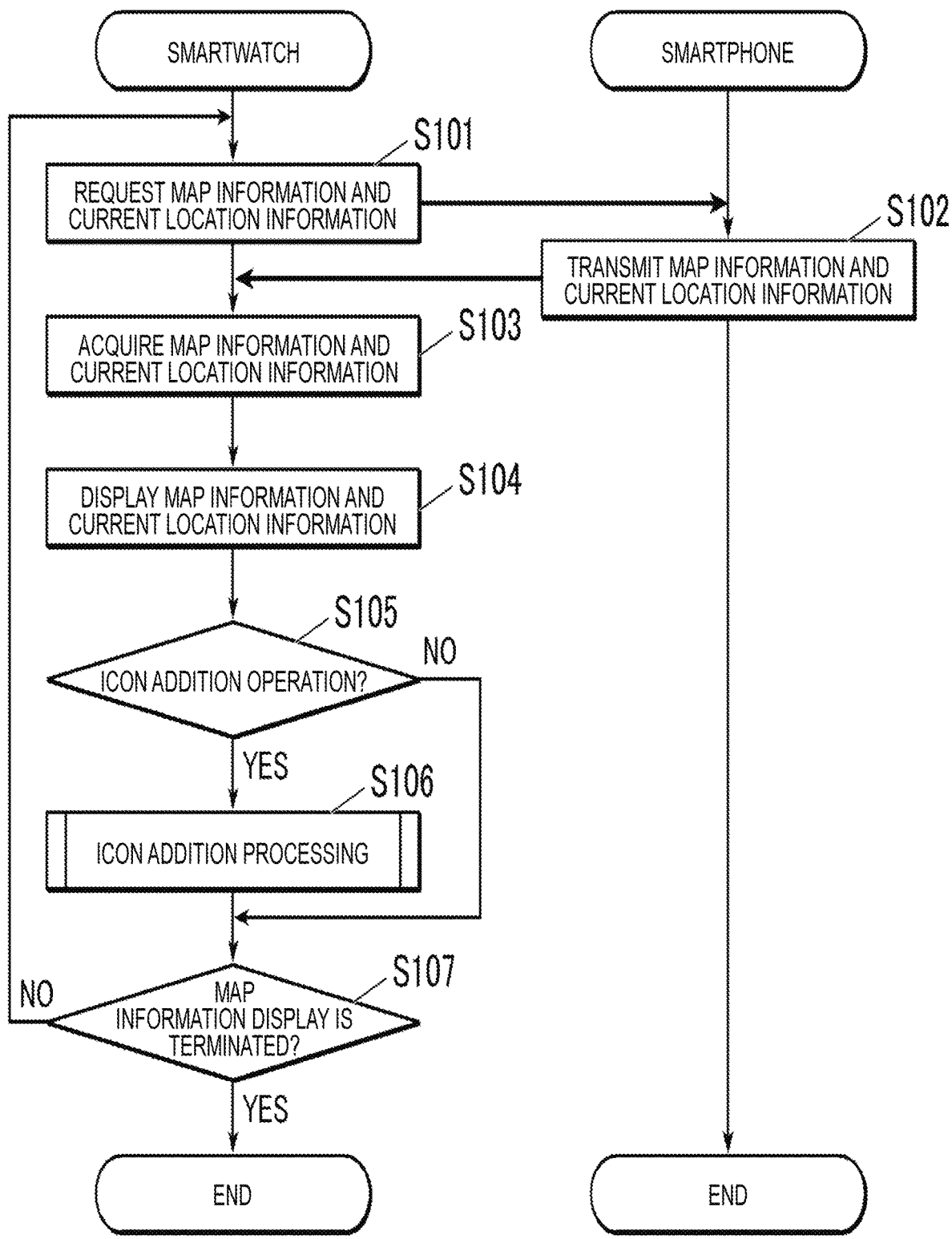
FIG. 4 is a flowchart illustrating an exemplary map information display processing according to the embodiment.

The map information display processing performed by the map information display system 100 according to the present embodiment will be first described with reference to FIGS. 4 to 8. FIG. 4 is a flowchart illustrating the map information display processing according to the present embodiment by way of example. FIGS. 5A and 5B are diagrams illustrating exemplary screens displayed on the display unit 104 when a user browses map information. FIGS. 6A to 6C are diagrams illustrating exemplary screens displayed on the display unit 104 when map information is enlarged or reduced. FIGS. 7A to 7D are diagrams illustrating exemplary screens displayed on the display unit 104 when an icon is added onto map information. FIG. 8 is a diagram illustrating an exemplary screen displayed on the display unit 104 when various settings are changed.

The map information display processing is performed when a predetermined operation is performed by the operation input unit 102 in the smartwatch 1 at any timing when the user browses map information.

At first, as illustrated in FIG. 4, the CPU 101 in the smartwatch 1 requests map information and current location information to the smartphone 2 via the communication unit 106 (step S101).

The CPU 201 in the smartphone 2 then acquires the current location information indicating a current location of the user by the satellite radiowave reception module 208, acquires the map information by the communication unit 206 from an external server via a communication network, and transmits the map information and the current location information to the smartwatch 1 by the communication unit 206 (step S102). The map information acquired herein is based on the acquired current location information, and is map information within a predetermined distance about the current location indicated by the current location information.

The CPU 101 in the smartwatch 1 then acquires the map information and the current location information by the communication unit 106 (step S103).

The CPU 101 then causes the display unit 104 to display the acquired map information and current location information (step S104). The map information displayed on the display unit 104 will be described herein with reference to FIGS. 5A and 5B.

The display unit 104 displays thereon a screen G5*a* illustrated in FIG. 5A, for example. The screen G5*a* displays therein a map within a predetermined distance about a current location pin P51 indicating a current location of the user, and further displays therein a current location button P52, a zoom button P53, a memo type button P54, a function drawer P55 and the like. A location of the current location pin P51 on the map information is determined on the basis of the current location information acquired in step S103.

When the display unit 104 is swiped by the user while the screen G5*a* is being displayed, the CPU 101 causes the map information to be scrolled in the swiped direction, and causes the display unit 104 to display the map information around the current location pin P51, or a screen G5*b* illustrated in FIG. 5B, for example. When the current location button P52 is tapped by the user while the screen G5*b* is being displayed, the CPU 101 causes the display unit 104 to display the screen G5*a* about the current location pin P51 again.

When the zoom button P53 on the screen G5*a* is tapped or the press button switch 102*a* is pressed by the user while the screen G5*a* is being displayed, the CPU 101 causes the display unit 104 to display a screen G6*a* in which the zoom button P53 and the memo type button P54 are switched to an enlargement button P61 and a reduction button P62, respectively (see FIG. 6A). When the enlargement button P61 is tapped, the press button switch 102*a* is pressed, or the pinch-out operation is performed on the display unit 104 by the user while the screen G6*a* is being displayed, the CPU 101 causes the display unit 104 to display a screen G6*b* of the map on the screen G6*a* enlarged in a predetermined magnification (see FIG. 6B). Similarly, when the reduction button P62 is tapped, the press button switch 102*c* is pressed, or the pinch-in operation is performed on the display unit 104 by the user while the screen G6*a* is being displayed, the CPU 101 causes the display unit 104 to display a screen G6*c* of the map on the screen G6*a* reduced in a predetermined magnification (see FIG. 6C). When the display unit 104 is swiped by the user even while the map information enlarged or reduced in this way is being displayed, the map information around the current location pin P51 is displayed in the swiped direction. The map information may be enlarged or reduced after the display unit 104 is swiped by the user.

Figure 7A:
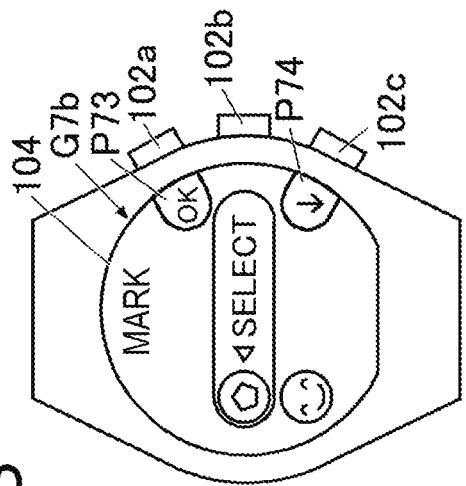
FIGS. 7A to 7D are diagrams illustrating exemplary screens displayed when an icon is added onto map information.

When the memo type button P54 is tapped or the press button switch 102*c* is pressed by the user while the screen G5*a* is being displayed, the CPU 101 causes the display unit 104 to display a screen G7*a* in which the zoom button P53 and the memo type button P54 are switched to a mark button P71 and a memo button P72, respectively (see FIG. 7A). When the mark button P71 is tapped or the press button switch 102*a* is pressed by the user while the screen G7*a* is being displayed, the CPU 101 causes the display unit 104 to display a list display screen G7*b* described below (see FIG. 7B). When the memo button P72 is tapped or the press button switch 102*c* is pressed by the user while the screen G7*a* is being displayed, the CPU 101 causes the display unit 104 to display a speech standby screen G7*c* described below (see FIG. 7C).

When the function drawer P55 is tapped or the display unit 104 is swiped above from the lowermost part by the user while the screen G5*a* is being displayed, the CPU 101 causes the display unit 104 to display a function drawer screen G8 illustrated in FIG. 8. The function drawer screen G8 displays therein a "▲" button P81, a "voice memo" button P82, a "mark" button P83, a "history" button P84, and a "set" button P85. When the "voice memo" button P82 is tapped by the user, the CPU 101 causes the display unit 104 to display the speech standby screen G7*c* illustrated in FIG. 7C. When the "mark" button P83 is tapped by the user, the CPU 101 causes the display unit 104 to display the list display screen G7*b* illustrated in FIG. 7B. When the "history" button P84 is tapped by the user, the CPU 101 causes the display unit 104 to display a screen G15 illustrated below in FIG. 15. When the "set" button P85 is tapped by the user, the CPU 101 causes the display unit 104 to display a screen (not illustrated) for changing various settings thereon. When the "▲" button P81 is tapped or any of the press button switches 102*a* to 102*c* is pressed by the user, the CPU 101 finishes displaying the function drawer screen G8, and causes the display unit 104 to display the screen G5*a*, for example. The function drawer screen G8 may finish being displayed also when a user operation is not input for a predetermined time while the function drawer screen G8 is being displayed.

When a user operation is not input for a predetermined time while the screen G5*a*, G5*b*, G6*a* to G6*c* or the like is being displayed on the display unit 104, the CPU 101 may cause the current location button P52, the zoom button P53, the memo type button P54, the function drawer P55, the enlargement button P61, and the reduction button P62 to be erased from the display unit 104. The buttons P52 to P55, P61, and P62 may be erased at the same time or may be sequentially erased over time. The buttons P52 to P55, P61, and P62 may be changed in their expression to be obscure in pale tone instead of being erased.

As illustrated in FIG. 4, the CPU 101 then determines whether the user has performed an icon addition operation (step S105). Specifically, when the memo type button P54 is tapped (or the press button switch 102*c* is pressed) by the user and then the mark button P71 is tapped (or the press button switch 102*a* is pressed) while the screens G5*a* and G5*b* illustrated in FIG. 5A, 5B, or the like is being displayed, the CPU 101 determines that the icon addition operation has been performed. When the "mark" button P83 is tapped by the user while the function drawer screen G8 illustrated in FIG. 8 is being displayed, for example, the CPU 101 determines that the icon addition operation has been performed.

When determining that the icon addition operation has been performed (step S105; YES), the CPU 101 performs the icon addition processing of adding a selected icon onto the displayed map information (step S106). The icon addition processing will be described below in detail.

When determining that the icon addition operation has not been performed (step S105; NO), the CPU 101 skips the icon addition processing in step S106, and performs the processing in step S107.

The CPU 101 then determines whether to finish displaying the map information in response to a user operation (step S107). Specifically, when the press button switch 102*b* is pressed by the user while the screens G5*a* and G5*b* illustrated in FIG. 5A, 5B, or the like is being displayed, for example, the CPU 101 determines to finish displaying the map information.

When determining not to finish displaying the map information (step S107; NO), the CPU 101 performs the processing in step S101. That is, the CPU 101 requests and acquires the current location information and the map information to the smartphone 2 again. Thereby, when the user moves, the current location pin P51 on the display unit 104 also moves to a position corresponding to the current location, and the map information is automatically scrolled and displayed again such that the current location pin P51 is positioned at the center of the display unit 104. Further, after an icon is added onto the map information once in the processing in step S106, another icon may be further added onto the map information. In this case, another icon may be added at the same point on the map information or another icon may be added at other point on the map information.

When determining to finish displaying the map information (step S107; YES), the CPU 101 terminates the map information display processing.

(Icon Addition Processing)

Figure 9:
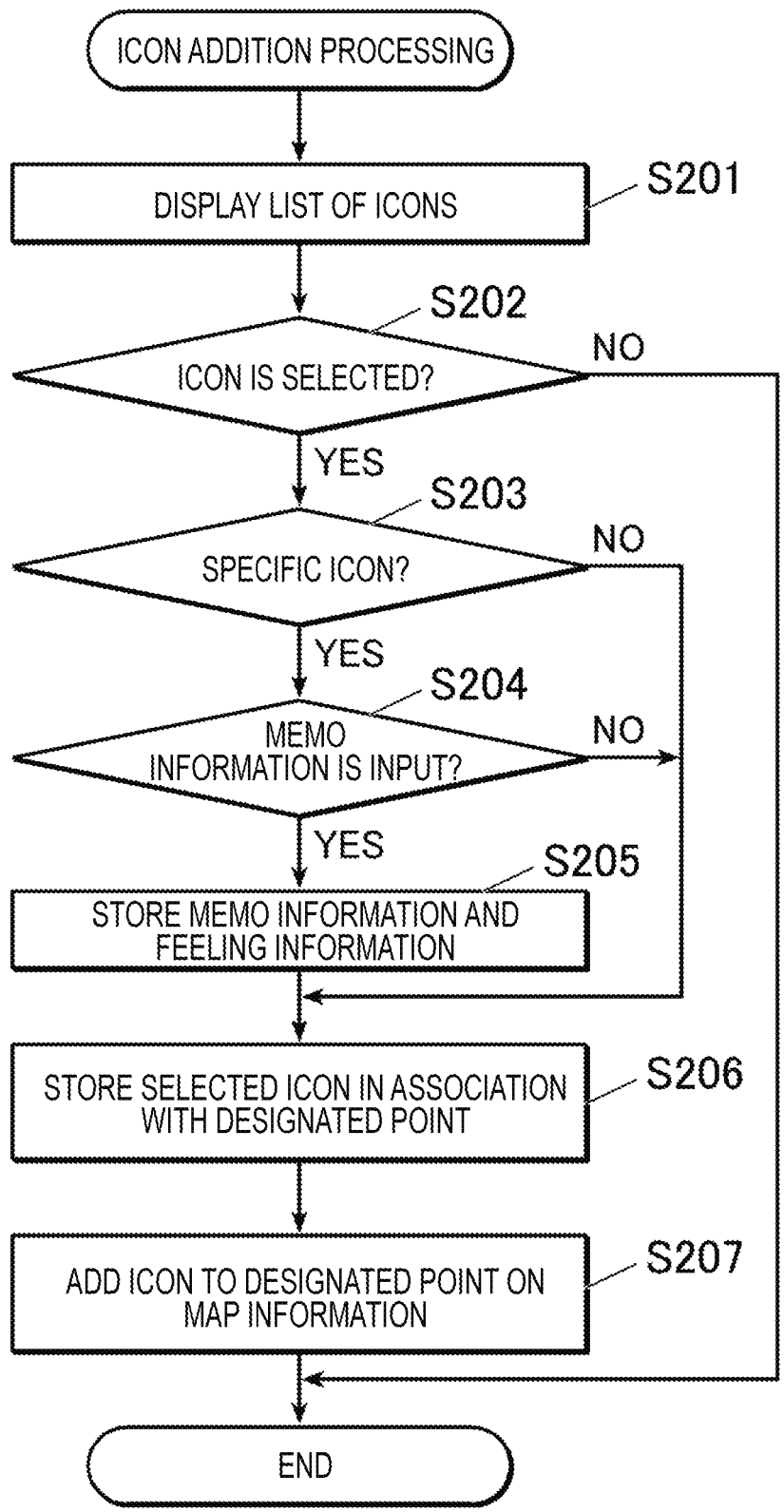
FIG. 9 is a diagram illustrating an exemplary icon addition processing according to the embodiment.
Figure 10:
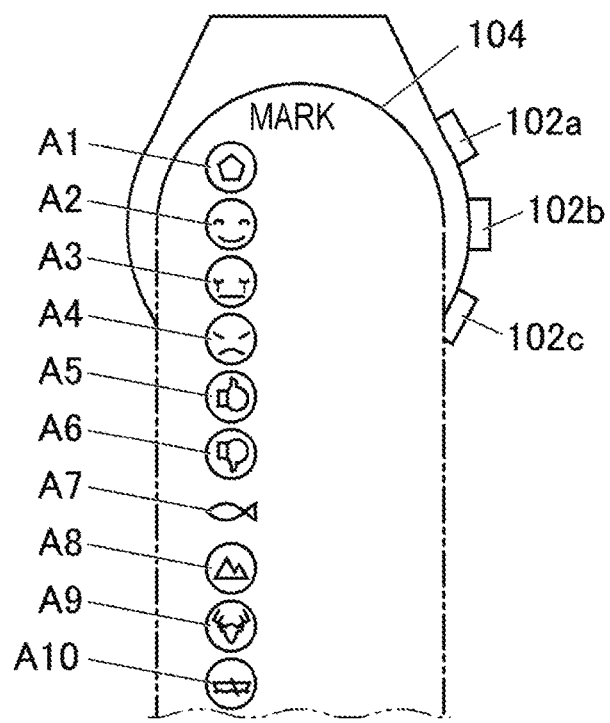
FIG. 10 is a diagram illustrating exemplary user-selectable icons.
Figure 11A:
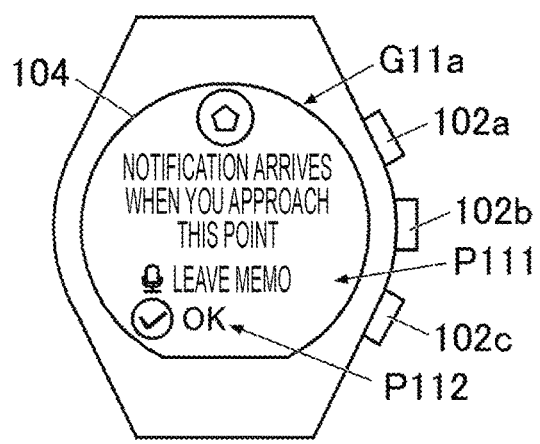
FIGS. 11A and 11B are diagrams illustrating exemplary screens displayed when memo information is stored.
Figure 11B:
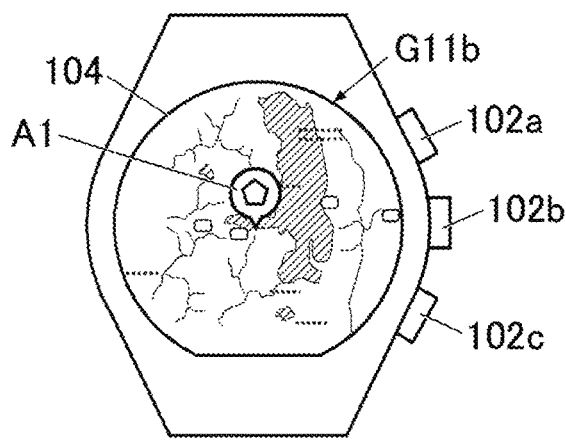

The icon addition processing performed by the map information display system 100 according to the present embodiment will be described below with reference to FIGS. 9 to 11B. FIG. 9 is a flowchart illustrating the icon addition processing according to the present embodiment by way of example. FIG. 10 is a diagram illustrating exemplary user-selectable icons. FIGS. 11A and 11B are diagrams illustrating exemplary screens displayed on the display unit 104 when memo information is stored.

Figure 7B:
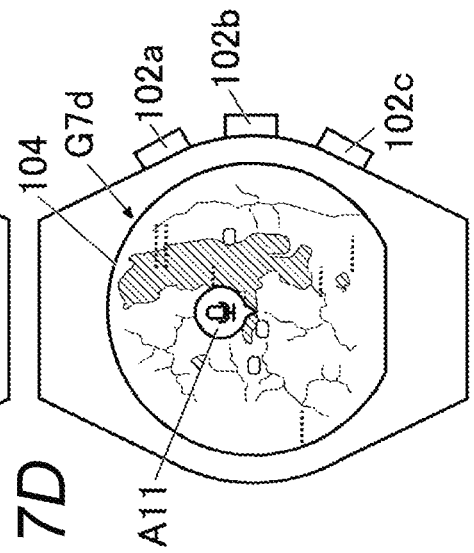
Figure 8:
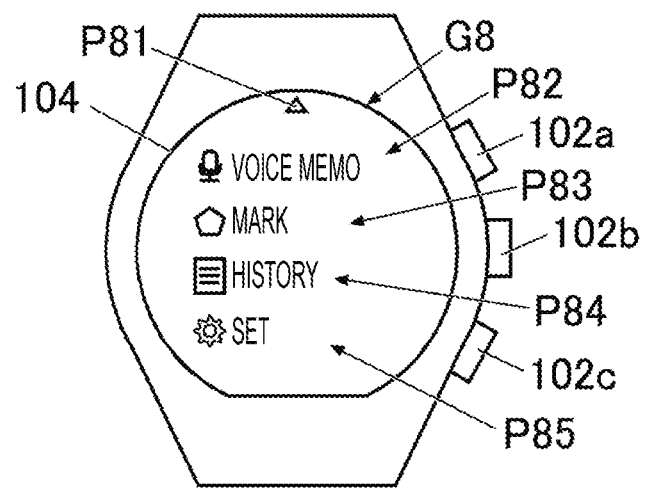
FIG. 8 is a diagram illustrating an exemplary screen displayed when various settings are changed.

As illustrated in FIG. 9, the CPU 101 in the smartwatch 1 first causes the display unit 104 to display the list display screen G7*b* illustrated in FIG. 7B, for example, thereby presenting a plurality of icons (step S201).

As illustrated in FIG. 7B, an icon in a frame-shaped cursor and its adjacently-arranged icons among the vertically-arranged different icons are displayed on the list display screen G7b. When being displayed on the display unit 104, the cursor is arranged to surround an icon arranged at the uppermost part. The example of FIG. 7B assumes that a specific icon A1 described below is arranged at the uppermost part, but the CPU 101 causes the display unit 104 to display an icon most recently selected by the user at the uppermost part. When an icon decision button P73 is pressed or the press button switch 102a is pressed by the user while the list display screen G7b is being displayed, the CPU 101 selects an icon surrounded by the cursor and adds the icon onto the map information. When a flick button P74 is tapped or the press button switch 102c is pressed by the user while the list display screen G7b is being displayed, the CPU 101 moves the cursor to a position to surround the next icon down, and causes the display unit 104 to display the icon and its adjacent icons. Exemplary user-selectable icons are illustrated in FIG. 10. As illustrated in FIG. 10, all the icons are associated with predetermined information, and are different from each other. The icons are stored in the storage unit 105, and the user operates the smartwatch 1 to select an icon suitable for the situation at that time.

It is assumed that all the icons stored in the storage unit 105 may not be displayed on the display unit 104 for presentation and only the icons extracted by the CPU 101 may be displayed on the display unit 104 for presentation in the processing in step S201. For example, the CPU 101 may extract any one or more icons on the basis of the current location information acquired from the smartphone 2 in the processing in step S103 in the map information display processing.

Specifically, the CPU 101 may extract an icon corresponding to a current location indicated by the acquired current location information. For example, when a current location is near a river, a lake, or the sea, a plurality of icons including an icon A7 associated with "fish" and an icon A10 associated with a "boat" illustrated in FIG. 10 may be extracted. When a current location is at a high altitude such as mountain, a plurality of icons including an icon A8 associated with "mountain" and an icon A9 associated with "animal" illustrated in FIG. 10 may be extracted. Further, the CPU 101 may not only acquire the current location information but also various items of information such as history of current locations, moving distance, moving speed, time/date, temperature, humidity, pressure, user's heart rate, or their changes, may analyze behaviors of the user on the basis of the information, and may extract icons suitable for the situation. In this case, the smartwatch 1 may comprise a sensor configured to detect various items of information, and the like, and the CPU 101 may acquire various items of information from the outside such as the smartphone 2.

As illustrated in FIG. 9, the CPU 101 then determines whether an icon has been selected (step S202). Specifically, when the icon decision button P73 is tapped (or the press button switch 102a is pressed) by the user while the list display screen G7b is being displayed, the CPU 101 determines that an icon has been selected. When a user operation is not input for a predetermined time or when the press button switch 102b is pressed while the list display screen G7b is being displayed, the CPU 101 determines that an icon has not been selected.

When determining that an icon has not been selected (step S202; NO), the CPU 101 skips the processings in steps S203 to S207 described below, and terminates the icon addition processing.

When determining that an icon has been selected (step S202; YES), the CPU 101 determines whether the selected icon is a specific icon (step S203). That is, the CPU 101 determines whether the selected icon is the icon A1.

When determining that the selected icon is not the specific icon A1 (step S203; NO), the CPU 101 skips the processings in steps S204 and S205 described below, and performs the processing in step S206 described below.

When determining that the selected icon is the specific icon A1 (step S203; YES), the CPU 101 determines whether memo information has been input as information corresponding to the icon (step S204).

When the selected icon is the specific icon A1, the CPU 101 causes the display unit 104 to display a confirmation screen for reporting predetermined information to the user when a predetermined condition is satisfied, such as a screen G11a on which "Notification arrives when you approach this point" is displayed, for example (see FIG. 11A). In this way, the specific icon A1 is added onto the map information and has a function of reporting predetermined information to the user when a predetermined condition is satisfied.

Figure 7C:
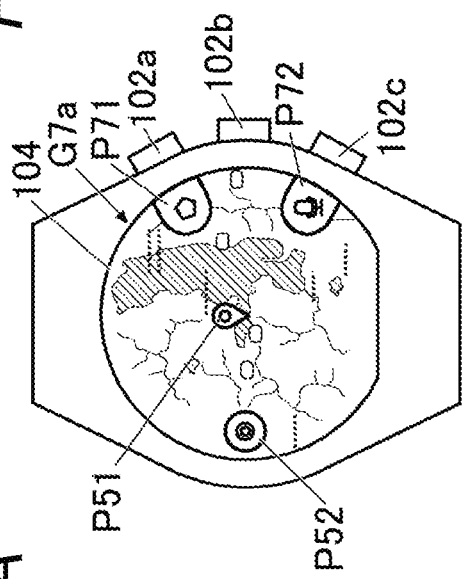
Figure 7D:
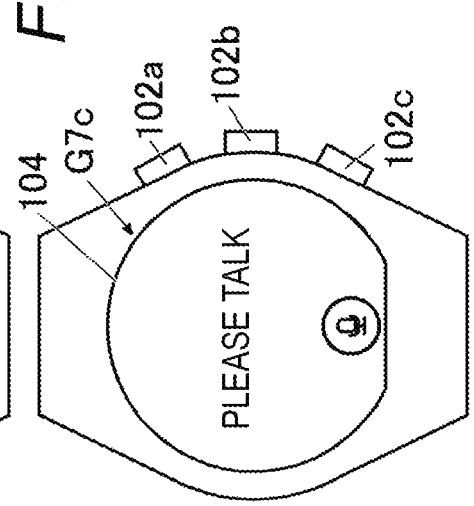

When a "leave memo" button P111 is tapped or the press button switch 102c is pressed by the user while the screen G11a is being displayed, the CPU 101 causes the display unit 104 to display the speech standby screen G7c illustrated in FIG. 7C, and determines that memo information has been input when the user has input his/her speech. Specifically, when the user issues his/her voice toward the smartwatch 1 while the speech standby screen G7c is being displayed, the speech is input via the microphone of the operation input unit 102. When an "OK" button P112 is tapped, the press button switch 102a or 102b is pressed by the user, or a user operation is not input for a predetermined time while the screen Glia is being displayed, the CPU 101 determines that memo information has not been input.

When determining that memo information has been input (step S204; YES), the CPU 101 converts the input speech into a character string to store the character string as memo information in the storage unit 105, and acquires and stores feeling information from the input speech into the storage unit 105 (step S205). The feeling information acquisition method may employ a conventional well-known technique so that the CPU 101 analyzes user-input speech and acquires feeling information indicating a feeling of the user. According to the present embodiment, the feeling information indicates that a feeling of the user who has input his/her speech is any of "hard/angry," "anxious," "steady," and "happy."

The CPU 101 may store the input speech as memo information together with or instead of the converted character string in the storage unit 105. When the input speech is stored as memo information instead of a character string, the speech is output in various processings described below instead of displaying a character string.

When determining that memo information has not been input (step S204; NO), the CPU 101 skips the processing in step S205 and performs the processing in step S206 described below.

The CPU 101 then causes the storage unit 105 to store the selected icon in association with designated point information indicating a designated point assuming the current location as the designated point (step S206). At this time, the CPU 101 counts a current time by the timer unit 107 to acquire time information, and stores the time information in the storage unit 105 together with the selected icon.

The CPU 101 causes the storage unit 105 to store the information, and then causes the display unit 104 to display a screen in which the selected icon is added onto the current location (designated point) on the map information, or a screen G11*b* illustrated in FIG. 11B, for example (step S207). When the selected icon is the specific icon A1 and memo information corresponding to the specific icon A1 has been input, the feeling information is stored in the storage unit 105 together with the memo information. Thus, the CPU 101 causes the display unit 104 to display the specific icon A1 in a changed color tone on the basis of the feeling information stored in the storage unit 105. More specifically the CPU 101 changes and displays a tone of the specific icon A1, for example, in red for the feeling information of "hard/anger," in blue for the feeling information of "anxious," in green for the feeling information of "steady," and in yellow for the feeling information of "happy."

When the specific icon A1 is tapped by the user while the screen G11*b* is being displayed and when memo information corresponding to the specific icon A1 is stored, the CPU 101 causes the display unit 104 to display a character string as the memo information. In this case, as described below, the CPU 101 may cause the display unit 104 to display the character string in a changed display form on the basis of the feeling information stored together with the memo information.

The icon addition processing is performed as described above.

The icon addition processing assumes that a user-selected icon from among a list of icons displayed on the list display screen G7*b* is added, but is not limited thereto. That is, when the memo button P72 is tapped (or the press button switch 102*c* is pressed) by the user while the screen G1*a* illustrated in FIG. 7A is being displayed, the speech standby screen G7*c* illustrated in FIG. 7C may be displayed and an icon may be added in response to user-input speech. Specifically, the CPU 101 causes the storage unit 105 to store the speech input via the microphone while the speech standby screen G7*c* is being displayed, in association with the current location information. At the same time, the CPU 101 analyzes the input speech to acquire the feeling information, and causes the storage unit 105 to store the acquired feeling information together with the speech. After causing the storage unit 105 to store the speech and the feeling information, the CPU 101 adds an icon A11 indicating that speech is input at the point to the current location on the map information in a changed color tone based on the feeling information, and causes the display unit 104 to displays a screen G7*d* illustrated in FIG. 7D, for example. When the icon A11 on the screen G7*d* is tapped by the user, the CPU 101 causes the output unit 109 to reproduce the input speech. The CPU 101 may convert the input speech into a character string and store the character string in the storage unit 105 together with or instead of the speech. In this case, when the icon A11 on the screen G7*d* is tapped by the user, the CPU 101 may cause the display unit 104 to display the character string in a changed display form based on the feeling information.

The icon addition processing assumes that an icon is added with a current location indicated by the current location information as designated point, but an icon may be added with user-selected location on the map information as designated point. In this case, as in the screen G5*b* illustrated in FIG. 5B, for example, the map information around a current location is displayed on the display unit 104 and the predetermined operation such as tapping the mark button P71 is performed, thereby adding an icon onto the center of the display unit 104.

(Report Processing)

Figure 12:
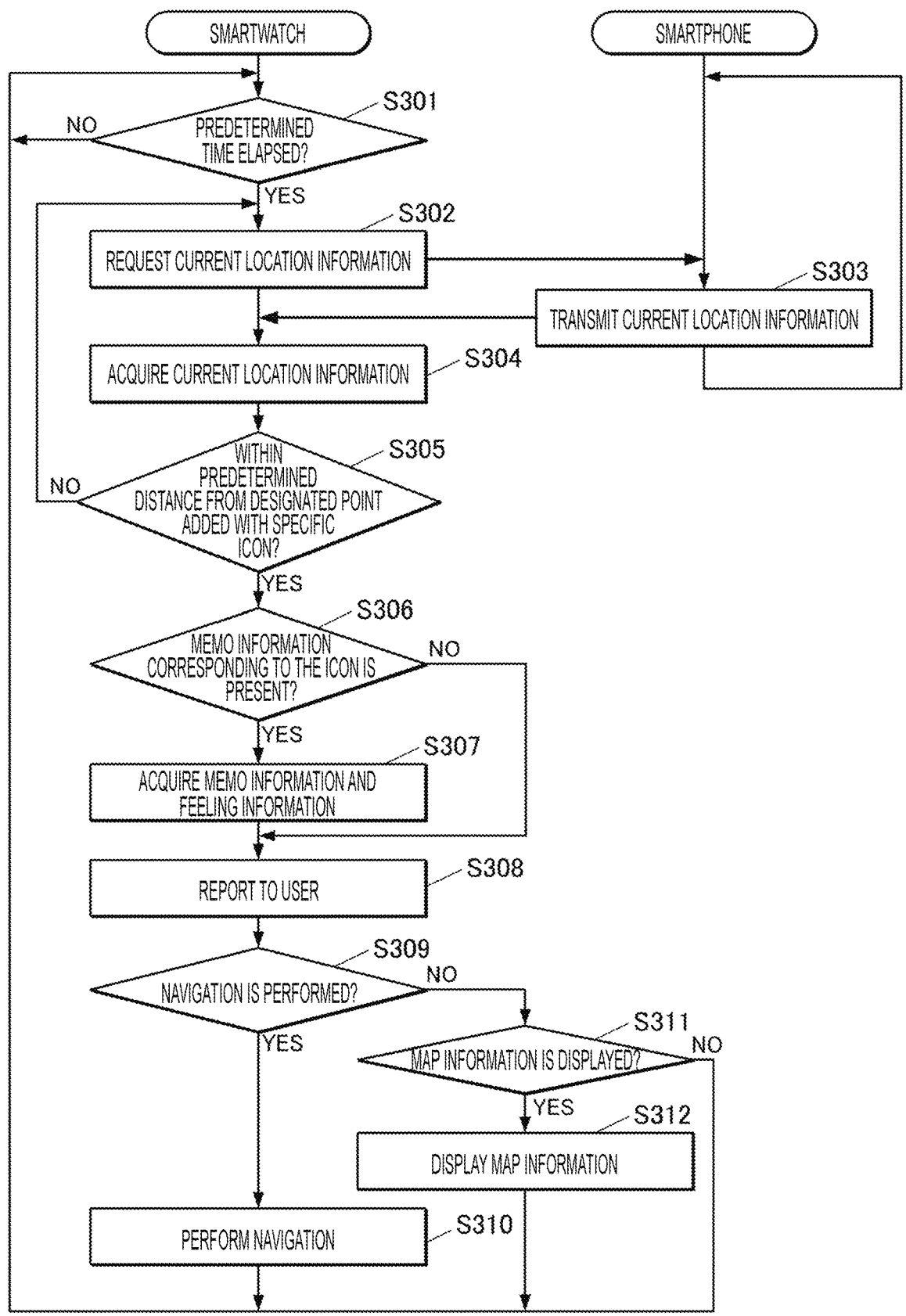
FIG. 12 is a flowchart illustrating an exemplary report processing according to the embodiment.
Figure 13:
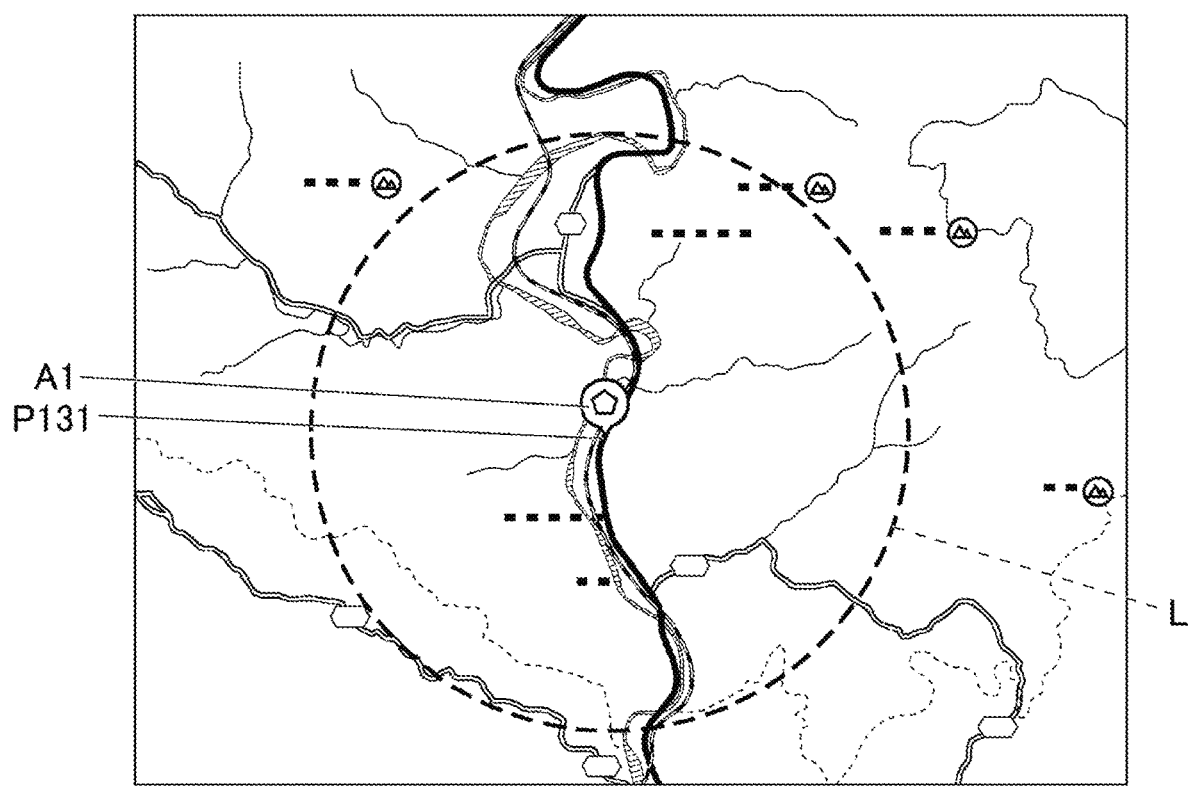
FIG. 13 is a diagram for explaining a condition under which predetermined information is reported to a user.
Figure 14A:
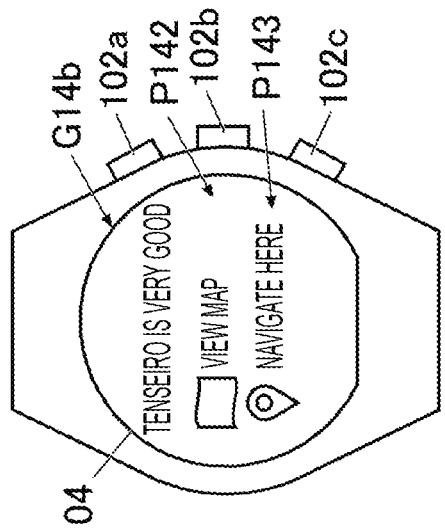
FIGS. 14A to 14C are diagrams illustrating exemplary screens displayed when predetermined information corresponding to an icon is reported.
Figure 14B:
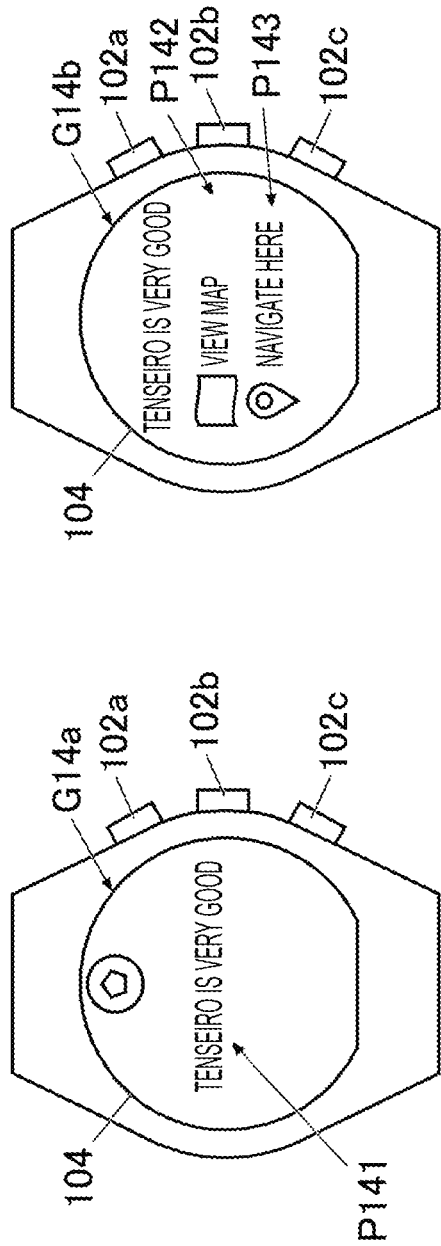
Figure 14C:
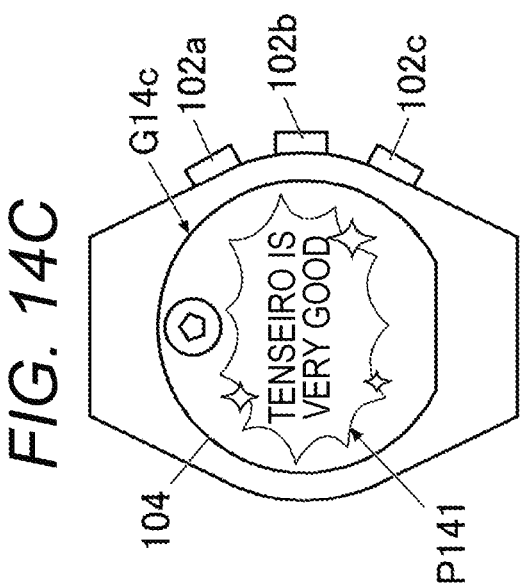

The report processing performed by the map information display system 100 according to the present embodiment will be subsequently described with reference to FIGS. 12 to 14C. FIG. 12 is a flowchart illustrating the report processing according to the present embodiment by way of example. FIG. 13 is a diagram for explaining a condition under which predetermined information is reported to the user. FIGS. 14A to 14C are diagrams illustrating exemplary screens displayed on the display unit 104 when predetermined information is reported.

The report processing is continuously performed while the power supply of the satellite radiowave reception module 208 in the smartphone 2 is ON. The report processing is performed only when the specific icon A1 is added onto the map information in the icon addition processing, and is not performed when the specific icon A1 is not added onto the map information. When the specific icons A1 are added onto the map information, the report processing is performed for each of them.

As illustrated in FIG. 12, the CPU 101 in the smartwatch 1 first determines whether a predetermined time has elapsed since the specific icon A1 was added (step S301). Specifically, the CPU 101 determines whether one or more days have elapsed since a time indicated by the time information on the basis of the time information stored in the storage unit 105 together with the icon, for example. Thereby, when little time has elapsed since an icon was added to a user-designated point and the like, predetermined information can be prevented from being reported, information is restricted from being frequently reported to the user, and convenience can be improved.

When determining that the predetermined time has not elapsed (step S301; NO), the CPU 101 performs the processing in step S301 again. When determining that the predetermined time has elapsed (step S301; YES), the CPU 101 requests the current location information to the smartphone 2 by the communication unit 106 (step S302).

The CPU 201 in the smartphone 2 then acquires the current location information indicating a current location of the user by the satellite radiowave reception module 208, and transmits the current location information to the smartwatch 1 by the communication unit 206 (step S303).

The CPU 101 in the smartwatch 1 then acquires the current location information by the communication unit 106 (step S304).

The CPU 101 then determines whether the current location indicated by the current location information acquired in the processing in step S304 is within a predetermined distance from the designated point added with the specific icon A1 (step S305). Specifically, the CPU 101 determines whether the current location indicated by the acquired current location information is within a region L in a broken line at a radius of 5 km from a designated point P131 added with the specific icon A1 as illustrated in FIG. 13, for example. Thereby, only when the user approaches the designated point added with the specific icon A1, the predetermined information can be reported and the information is restricted from being frequently reported to the user, thereby improving convenience. When the feeling information corresponding to the specific icon A1 is stored in the storage unit 105, the CPU 101 changes a distance to be determined on the basis of the feeling information. For example, when the feeling information indicates "steady," a determination is made as to whether the current location is at a radius of 5 km from the designated point, when the feeling information indicates "happy," a determination is made as to whether the current location is at a radius of 10 km from the designated point, and when the feeling information indicates "hard/ angry" or "anxious," a determination is made as to whether the current location is at a radius of 3 km from the designated point.

As illustrated in FIG. 12, when determining that the current location is not within the predetermined distance from the designated point (step S305; NO), the CPU 101 performs the processing in step S302 again.

When determining that the current location is within the predetermined distance from the designated point (step S305; YES), the CPU 101 determines the presence of memo information corresponding to the specific icon A1 added to the designated point (step S306).

When determining that the memo information is present (step S306; YES), the CPU 101 acquires the memo information and the feeling information corresponding thereto from the storage unit 105 (step S307). On the other hand, when determining that the memo information is not present (step S306; NO), the CPU 101 skips the processing in step S307.

The CPU 101 in the smartwatch 1 then reports the predetermined information corresponding to the icon to the user (step S308). Specifically, the CPU 101 causes the display unit 104 to display the specific icon A1 thereby to report the approach to the designated point to the user, and reports that the memo information is acquired in the processing in step S307 together if any. When the feeling information is acquired in the processing in step S307, the color tone of the specific icon A1 and the display form of the memo information are changed on the basis of the acquired feeling information to be displayed on the display unit 104 and to be reported. Specifically, the CPU 101 causes the display unit 104 to display a screen G14a illustrated in FIG. 14A, for example. A memo information display region P141 in the screen G14a displays therein the specific icon A1 in a color tone based on the feeling information acquired in the processing in step S307 and displays therein the memo information of "tenseiro is very good" acquired in the processing in step S307 in a display form based on the feeling information acquired in the processing in step S307. That is, there is illustrated, by way of example, that the CPU 101 changes and displays the color tone of the specific icon A1 and the display form of the memo information on the basis of the feeling information acquired in the processing in step S307, and the feeling information is "steady" on the screen G14a illustrated in FIG. 14A. For example, the CPU 101 causes the display unit 104 to display a screen G14c illustrated in FIG. 14C when the feeling information indicates "happy." The color tone of the specific icon A1 and the display form of the memo information are changed and displayed on the screen (not illustrated) depending on the feeling information also when the feeling information indicates "hard/angry" or "anxious."

"To report" according to the present invention indicates to report predetermined information to the user and to let the user know the fact in a different form from the display of the map information, icons, and designated point by the display unit 104 and in a form with a higher report effect than the display of the map information, icons, and designated point by the display unit 104. Further, "higher report effect" indicates that the user can easily know the presence of predetermined information corresponding to an icon. To report according to the present invention may be to display the specific icon A1 on the display unit 104, to display the screen G14a or the screen G14c illustrated in FIG. 14A or 14C on the display unit 104, to emphasize and display the specific icon A1 on the display unit 104, to output speech or vibration by the output unit 109, or to perform a combination thereof, for example. Further, the report method may be changed on the basis of the acquired feeling information, and for example, a different vibration may be output by the output unit 109 depending on the feeling information, or a positive melody is reproduced by the output unit 109 when the feeling information indicates "steady" or "happy."

Therefore, to report does not include a form in which the user moves and approaches a designated point so that the map information displayed on the display unit 104 is sequentially scrolled and consequently an icon itself added onto the map information is displayed on the display unit 104. That is, reporting according to the present invention provides higher report effect than in a form in which the icons added onto the map information appear on the display unit 104 when the user simply moves and approaches a designated point.

When the display unit 104 is tapped by the user while the screen G14a or the screen G14c is being displayed, the CPU 101 causes the display unit 104 to display a screen G14b illustrated in FIG. 14B, for example. The screen G14b displays therein a "view map" button P142 and a "navigate here" button P143.

As illustrated in FIG. 12, the CPU 101 then determines whether to perform navigation (step S309). Specifically, when the "navigate here" button P143 is tapped by the user while the screen G14b illustrated in FIG. 14B is being displayed on the display unit 104, the CPU 101 determines to perform navigation.

When determining to perform navigation (step S309; YES), the CPU 101 performs navigation (step S310). Specifically, the CPU 101 performs navigation in a well-known method such as displaying a route guidance from a current location to a designated point on the display unit 104 or outputting a speech guidance by the output unit 109 on the basis of the current location information and the map information. After performing navigation, the CPU 101 performs the processing in step S301 again.

On the other hand, when determining not to perform navigation (step S309; NO), the CPU 101 determines whether to display the map information (step S311). Specifically, when the "view map" button P142 is tapped by the user while the screen G14b illustrated in FIG. 14B is being displayed on the display unit 104, the CPU 101 determines to display the map information.

When determining to display the map information (step S311; YES), the CPU 101 causes the display unit 104 to display the map information (step S312). Specifically, the CPU 101 switches the screen G14b to indicate the steps S101 to S104 in the map information display processing illustrated in FIG. 4, and causes the display unit 104 to display the map information in substantially the same region as the region L in a broken line in FIG. 13 together with the specific icon A1. The CPU 101 causes the map information in which the specific icon A1 is superposed on the designated point to be displayed in this way. After displaying the map information, the CPU 101 performs the processing in step S301 again.

When determining not to display the map information (step S311; NO), the CPU 101 skips the processing in step S312, and performs the processing in step S301 again.

The report processing is performed in this way, and the CPU 101 repeatedly reports predetermined information to the user whenever a predetermined condition is satisfied.

The report processing assumes that predetermined information is repeatedly reported to the user whenever a predetermined condition is satisfied, but is not limited thereto. For example, when the information on the specific icon A1 stored in the storage unit 105 is deleted by a user operation, the setting is changed not to make a report even when a predetermined condition is satisfied by a user operation, or the application for performing the report processing is terminated by a user operation, the report processing may be terminated. After reporting predetermined information to the user, the CPU 101 may determine whether the predetermined time has elapsed since predetermined information was previously reported, and may perform step S301 again when determining that the predetermined time has elapsed.

The processing in step S301 is assumed to determine whether one or more days have elapsed, but is not limited thereto. For example, a determination may be made as to whether two or more hours, six or more hours, one or more weeks, or one or more months have elapsed. There may be configured such that a determination is made as to whether a current position has moved from the designated point added with the specific icon A1 by a predetermined distance, and when it is determined that the current location has moved more than a predetermined distance, the processing is determined as YES in step S301 and proceeds to step S302. When it is determined that the state in which the set predetermined condition (at a radius of 5 km from the designated point) is satisfied enters the state in which the predetermined condition is not satisfied, the predetermined information on the icon A1 is permitted to report to the user. That is, when a determination is made as to whether a report permission condition to permit predetermined information to be reported to the user is satisfied and it is determined that the report permission condition is satisfied, the predetermined information on the icon A1 is permitted to report to the user. There may be of course configured such that the predetermined information on the icon A1 is permitted to report to the user under a condition except the above report permission condition. The processing in step S305 is assumed to determine whether a current location is within a radius of 5 km from the designated point added with the specific icon A1, but is not limited thereto. For example, a determination may be made as to whether a current location is within a radius of 1 km, within a radius of 10 km, or within a radius of 50 km.

When a plurality of specific icons A1 are added onto the map information, the conditions determined in steps S301 and S305 may be different for each of the specific icons A1. Further, as described below, the setting of the conditions can be changed by a user operation.

The report processing assumes that the CPU 101 changes a threshold of a distance determined in the processing in step S305 on the basis of the feeling information corresponding to the icon, but is not limited thereto. For example, in addition to or instead of this, the CPU 101 may change a threshold of a time determined in the processing in step S301 on the basis of the feeling information corresponding the icon.

(Other Operations)

Figure 15:
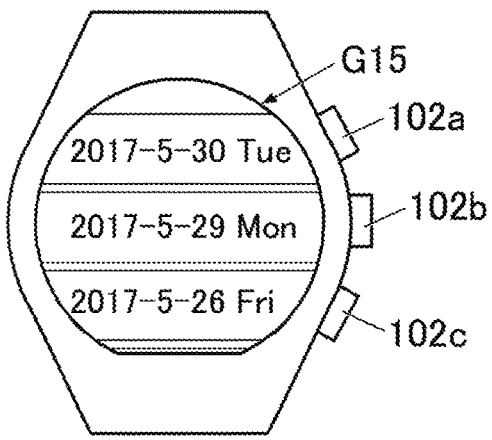
FIG. 15 is a diagram illustrating an exemplary screen displayed when a user browses a history of past-added icons.
Figure 16:
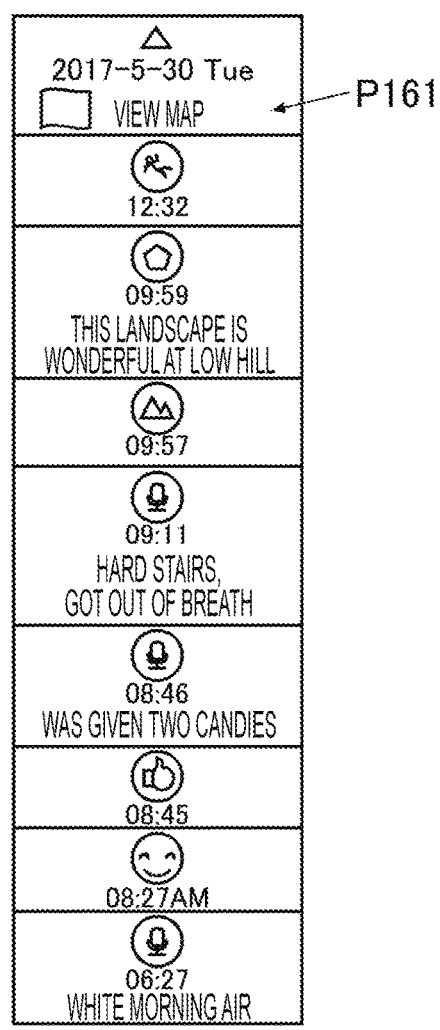
FIG. 16 is a diagram illustrating exemplary contents of a history of icons added on a predetermined date.
Figure 17:
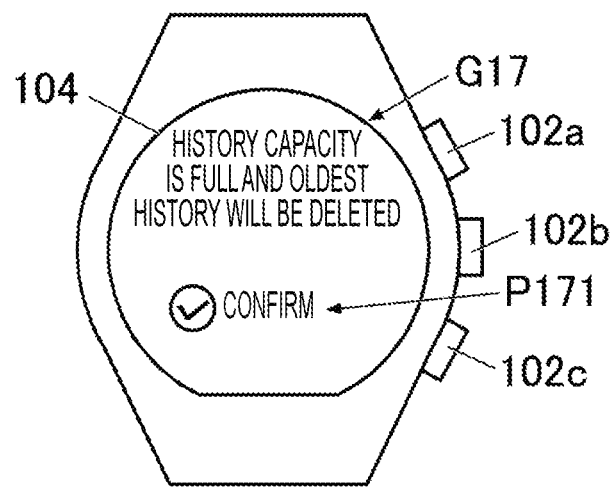
FIG. 17 is a diagram illustrating an exemplary screen displayed when the free space of a storage unit is lacking.
Figure 18:
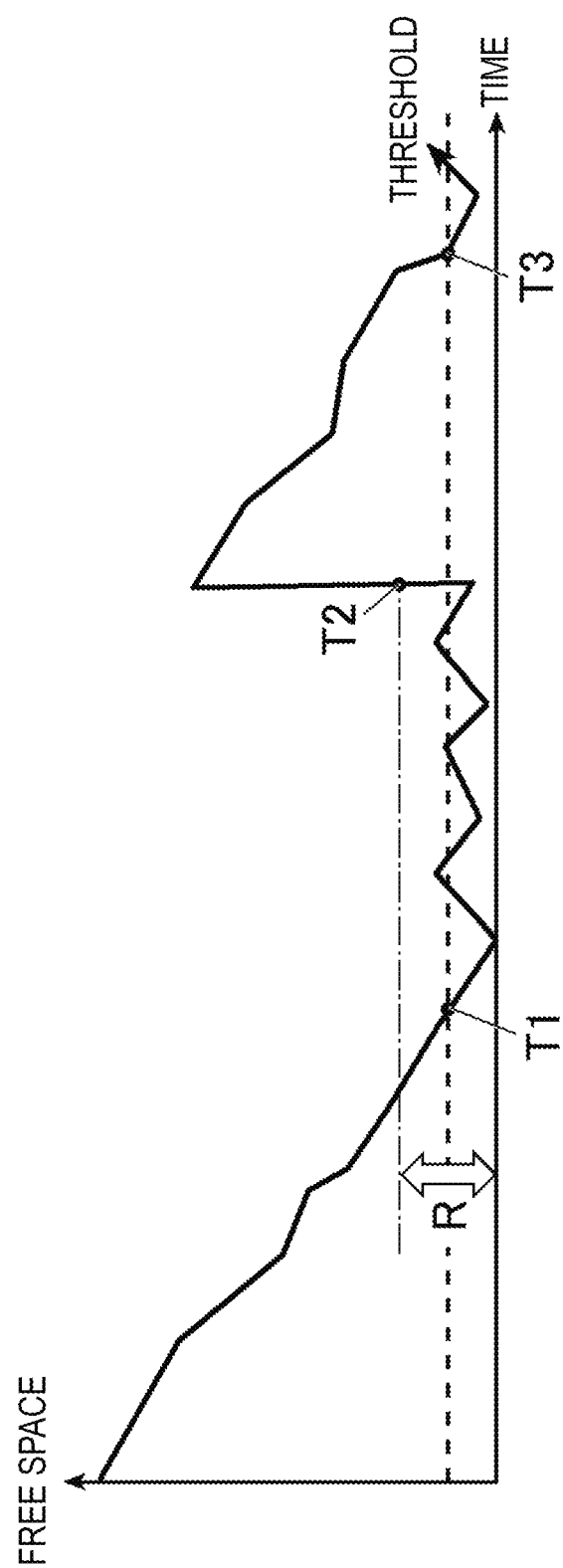
FIG. 18 is a graph illustrating exemplary transition of the free space of the storage unit over time.

The operations of the map information display system 100 according to the present embodiment other than the above operations will be described with reference to FIGS. 15 to 18. FIG. 15 is a diagram illustrating an exemplary screen displayed on the display unit 104 when the user confirms a history of past-added icons. FIG. 16 is a diagram illustrating an exemplary history of icons added on a predetermined date. FIG. 17 is a diagram illustrating an exemplary screen displayed on the display unit 104 when the free space of the storage unit is lacking. FIG. 18 is a graph illustrating exemplary transition of the free space of the storage unit over time.

The smartwatch 1 has a function of displaying a history of icons past added onto the map information by the user.

For example, when the "history" button P84 is tapped by the user while the function drawer screen G8 illustrated in FIG. 8 is being displayed on the display unit 104 in the smartwatch 1, the CPU 101 causes the display unit 104 to display the screen G15 illustrated in FIG. 15. The screen G15 is a screen in which a list of dates when the icons were past added onto the map information by the user is displayed. The dates when the icons were added are vertically arranged, and the latest date is arranged at the top in the screen G15. The CPU 101 causes the screen G15 to be scrolled by a user operation and causes the display unit 104 to display other date. When any of the dates displayed on the display unit 104, for example, "2017-5-30 Tue" is tapped by the user, the CPU 101 displays a list of user-added icons on May 30, 2017 on the display unit 104 as illustrated in FIG. 16, for example. A "view map" button P161 is displayed below the date of "2017-5-30 Tue" on the display unit 104. The times when the icons were added, and if any, the memo information corresponding to the icons are displayed together with all the icons added on May 30, 2017 below the "view map" button P161. Thereby, the user can review and make effective use of his/her past-added icons. When the "view map" button P161 is tapped by the user, the CPU 101 causes the display unit 104 to display the map information indicating the designated points added with the icons on May 30, 2017. When the icons are added in a wide area, the map information may be displayed in a scale in which all the icons are displayed on the display unit 104, or the map information may be displayed in a scale in which some of the icons are displayed on the display unit 104. When any icon in the displayed list is tapped by the user, the CPU 101 causes the display unit 104 to display a screen for selecting displaying the map information indicating the designated point added with the icon, performing navigation to the designated point, deleting the icon and its associated information or the like. When "2017-5-30 Tue" is tapped or the press button switch 102b is pressed by the user while the screen illustrated in FIG. 16 is being displayed, the CPU 101 causes the display unit 104 to display the screen G15 displaying therein a list of dates when the icons were past added again.

The smartwatch 1 has a function of notifying a user of the space shortage of the storage unit 105 if the storage unit 105 stores therein icons, designated point information, time information, memo information, and the like and thus the free space of the storage unit 105 is lacking.

For example, when determining whether the free space of the storage unit 105 is a threshold or less at a predetermined timing and determining that the free space is the threshold or less, the CPU 101 causes the display unit 104 to display a screen G17 illustrated in FIG. 17 thereby to provide notification of the space shortage, for example. A message of "history capacity is full and oldest history will be deleted" is displayed and a "confirm" button P171 is displayed below the message on the screen G17. When the "confirm" button P171 is tapped by the user, the CPU 101 finishes displaying the screen G17.

The repeated notification of space shortage is complicated for the user, and thus the CPU 101 provides notification of space shortage once, and then does not provide notification of the space shortage again until the free space of the storage unit 105 is out of ±5% of the threshold. That is, for example, when the user performs the operation of deleting past-added icons or memo information, the free space of the storage unit 105 increases and goes outside the range of ±5% of the threshold. In this case, the history of notifications of space shortage is deleted, and notification of space shortage is provided when it is determined again that the free space of the storage unit 105 is the threshold or less. FIG. 18 illustrates exemplary transition of the free space of the storage unit 105 over time. As illustrated in FIG. 18, notification of space shortage is provided at timing T1 when the free space reaches the threshold or less, and the history of notifications of space shortage is deleted at timing T2 when the free space is outside the range R of ±5% of the threshold. Space shortage is notified again at timing T3 when the free space reaches the threshold or less.

The smartwatch 1 has a function of changing the settings of the above processings and functions.

For example, when the "set" button P85 is tapped by the user while the function drawer screen G8 illustrated in FIG. 8 is being displayed on the display unit 104 in the smartwatch 1, the CPU 101 causes the display unit 104 to display a screen (not illustrated) for changing various settings. Thereby, the user can perform, for example, an operation of changing the conditions (such as elapsed time since an icon is added to a designated point, and distance from a designated point) of the report processing, an operation of changing a type of a map, an operation of setting the report processing not be performed, and the like.

<<Technical Advantages of Present Embodiment>>

According to the present embodiment, the smartwatch 1 comprises the CPU 101 configured to acquire current location information, acquire map information based on the current location information, select any of a plurality of different icons associated with predetermined information, add an icon to a designated point designated on the map information by a user operation, and report the predetermined information corresponding to the icon added to the designated point to the user when a predetermined condition for the selected icon is satisfied, and the display unit 104 configured to display the map information as well as the icons added by the CPU 101 and their corresponding designated points, and thus the user can acquire predetermined information without positively reviewing or confirming the past-added icons. Therefore, the user can effectively and easily use the information added onto the map information.

The CPU 101 reports predetermined information corresponding to an icon to the user in a different form from the display by the display unit 104 and in a form with a higher report effect than the display by the display unit 104, and thus the user can easily know the reported predetermined information.

When a predetermined condition is satisfied again after reporting predetermined information corresponding to an icon added to the designated point to the user, the CPU 101 reports the predetermined information corresponding to the icon added to a designated point to the user, thereby reporting the predetermined information to the user several times. Thereby, the user can more effectively use the information added onto the map information.

When the user moves and approaches a designated point, the CPU 101 reports predetermined information corresponding to additional information in a different form from the form in which the additional information itself added onto the map information is displayed on the display unit 104, and thus the user can accurately know the information added onto the map information, and can accurately make effective use of the information.

When a current location indicated by the current location information is within a predetermined distance from a designated point, the CPU 101 reports the predetermined information corresponding to the icon to the user, and thus predetermined information can be reported only when the user approaches an icon-added designated point. Thereby, it is possible to prevent information from being frequently reported to the user and to improve convenience.

The CPU 101 reports predetermined information corresponding to an icon to the user on the basis of an elapsed time since the icon was added to the designated point, thereby reporting the predetermined information only after a certain period of time. Thereby, it is possible to prevent information from being frequently reported to the user and to improve convenience.

Predetermined information corresponding to an icon is user-input memo information, and thus the user can acquire the information based on his/her experience at a predetermined timing, thereby effectively using the past experience.

Memo information is input by user speech, and thus the user can easily input detailed information based on his/her experience.

The operation input unit 102 configured to provide the user with an interface for inputting memo information, or the display unit 104 is provided, and thus the user can easily input memo information.

The CPU 101 displays map information indicating a designated point after predetermined information corresponding to an icon is reported to the user, and thus the user can confirm the map information just when the predetermined information is reported.

The CPU 101 causes an icon added to a designated point to be overlapped and displayed on the designated point on the map information, and thus the user can confirm the designated point added with the icon on the map information just when the predetermined information is reported.

The CPU 101 performs navigation to a designated point on the basis of the current location information and the map information after predetermined information corresponding to an icon is reported to the user, and thus the user can easily reach the designated point added with the icon.

The CPU 101 displays a list of icons added to designated points in time series on the basis of the times when the icons were added to the designated points, and thus the user can review the icons past-added onto the map information and can effectively use the information added onto the map information.

The CPU 101 reports only predetermined information corresponding to a specific icon among the different icons, and thus it is possible to prevent information from being frequently reported to the user and to improve convenience.

The CPU 101 presents one or more icons among the different icons, and adds a user-selected icon among the presented icons to a designated point, and thus the user can easily select an icon to be added to a designated point.

The CPU 101 extracts one or more icons among the different icons on the basis of the current location information and presents the extracted icons, and thus the user can easily select an icon suitable for the situation.

The CPU 101 displays a list of two or more icons among the different icons, and arranges an icon most recently selected by the user at the start end, and thus the user can easily select a frequently-used icon.

The CPU 101 adds an icon assuming a current location indicated by the current location information as designated point, and thus the user can add an icon onto the map information in an easier operation.

When the CPU 101 adds an icon assuming a user-selected location on the map information as designated point, the user can add an icon to a desired point on the map information.

The CPU 101 acquires the feeling information indicating a user's feeling, and controls an icon or predetermined information corresponding to the icon on the basis of the acquired feeling information, and thus the user can effectively use the information on user's feeling.

The CPU 101 adds a selected icon in a changed display form based on the acquired feeling information, thereby adding the information on user's feeling onto the map information. Thereby, the user confirms the icon displayed on the display unit 104 thereby to recognize his/her feeling when adding the icon.

The CPU 101 displays a character string based on user-input speech as predetermined information corresponding to an icon in a changed display form on the basis of the feeling information acquired from the speech, and thus the user confirms the character string displayed on the display unit 104, thereby recognizing his/her feeling when inputting the character string.

The CPU 101 changes a predetermined condition for an icon on the basis of the acquired feeling information, thereby changing timing or frequency to report depending on user's feeling when the icon is added.

<<Variant 1>>

A variant 1 of the map information display system 100 according to the embodiment will be described. The points other than the following points are similar to the map information display system 100 according to the embodiment.

The map information display system according to the variant 1 is different from the map information display system 100 according to the embodiment in the following points. That is, the map information display system according to the variant 1 does not comprise the smartphone 2 and is configured of only the smartwatch 1. Thus, the smartwatch 1 in the map information display system according to the variant 1 performs alone various processings performed by the map information display system 100 according to the embodiment. Thus, the user has only to own the smartwatch 1, and the smartwatch 1 may not be in a data communicable state with the smartphone 2.

For example, the map information display system according to the variant 1, or the smartwatch 1 performs a map information display processing and a report processing as follows. An icon addition processing according to the variant 1 is similar to the icon addition processing performed by the map information display system 100 according to the embodiment.

(Map Information Display Processing)

Figure 19:
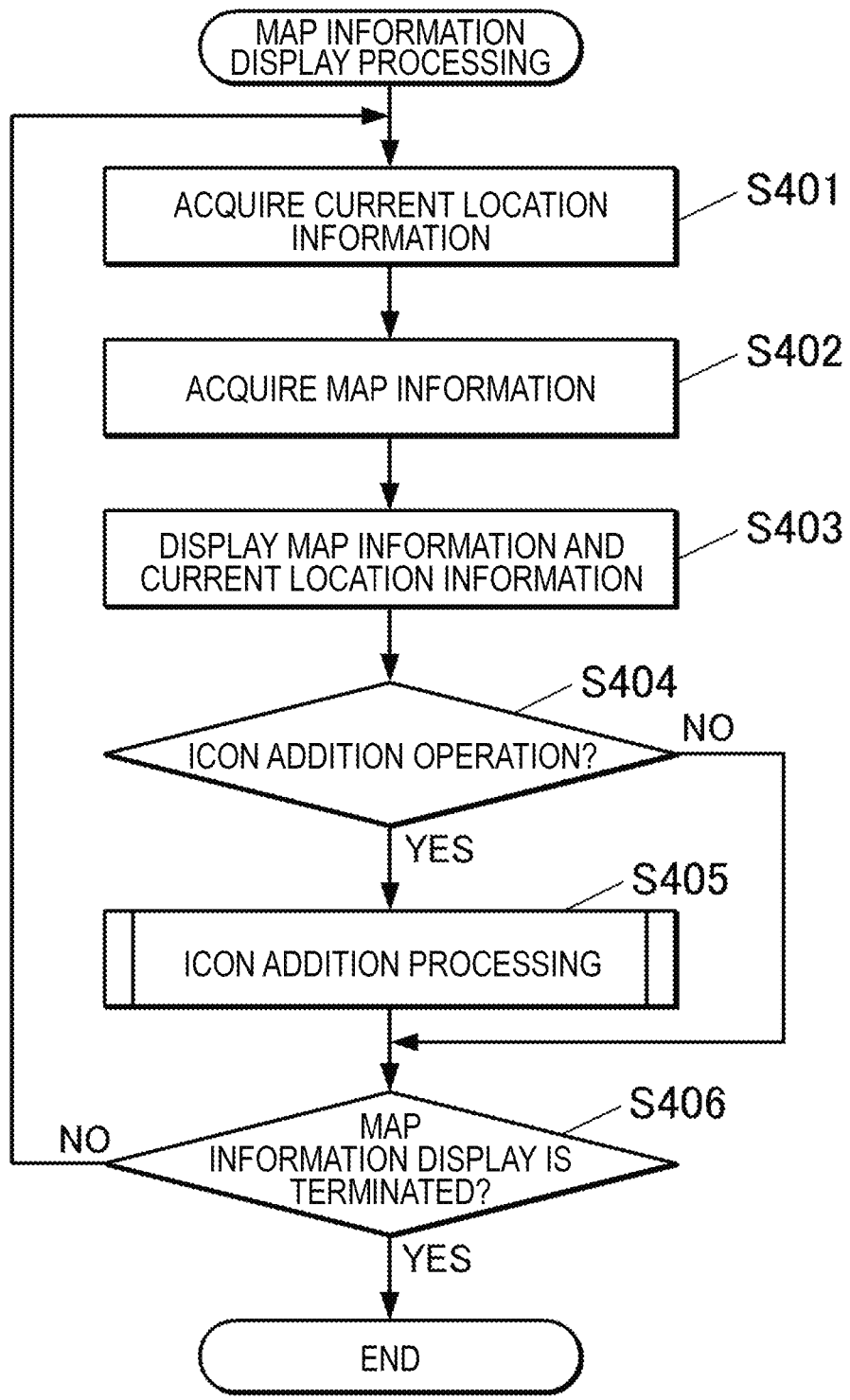
FIG. 19 is a flowchart illustrating an exemplary map information display processing according to a variant 1.

The map information display processing performed by the map information display system according to the variant 1 or the smartwatch 1 will be first described with reference to FIG. 19. FIG. 19 is a flowchart illustrating the map information display processing according to the variant 1 by way of example.

The map information display processing is performed when the operation input unit 102 in the smartwatch 1 performs a predetermined operation at any timing when the user confirms the map information.

At first, the CPU 101 in the smartwatch 1 acquires the current location information indicating a current location of the user by the satellite radiowave reception module 108 (step S401). The CPU 101 then acquires the map information previously stored in the storage unit 105 (step S402). The map information to be acquired herein is map information within a predetermined distance about the current location indicated by the current location information acquired in step S401.

The CPU 101 then causes the display unit 104 to display the map information and the current location information (step S403).

The CPU 101 then determines whether the user has performed the icon addition operation (step S404).

When determining that the icon addition operation has been performed (step S404; YES), the CPU 101 performs the icon addition processing of adding a user-desired icon onto the displayed map information similarly to the embodiment (step S405). When determining that the icon addition operation has not been performed (step S404; NO), the CPU 101 skips the icon addition processing in step S405 and performs the processing in step S406.

The CPU 101 then determines whether to finish displaying the map information in response to a user operation (step S406).

When determining not to finish displaying the map information (step S406; NO), the CPU 101 performs the processing in step S401 again. When determining to finish displaying the map information (step S406; YES), the CPU 101 terminates the map information display processing.

(Report Processing)

Figure 20:
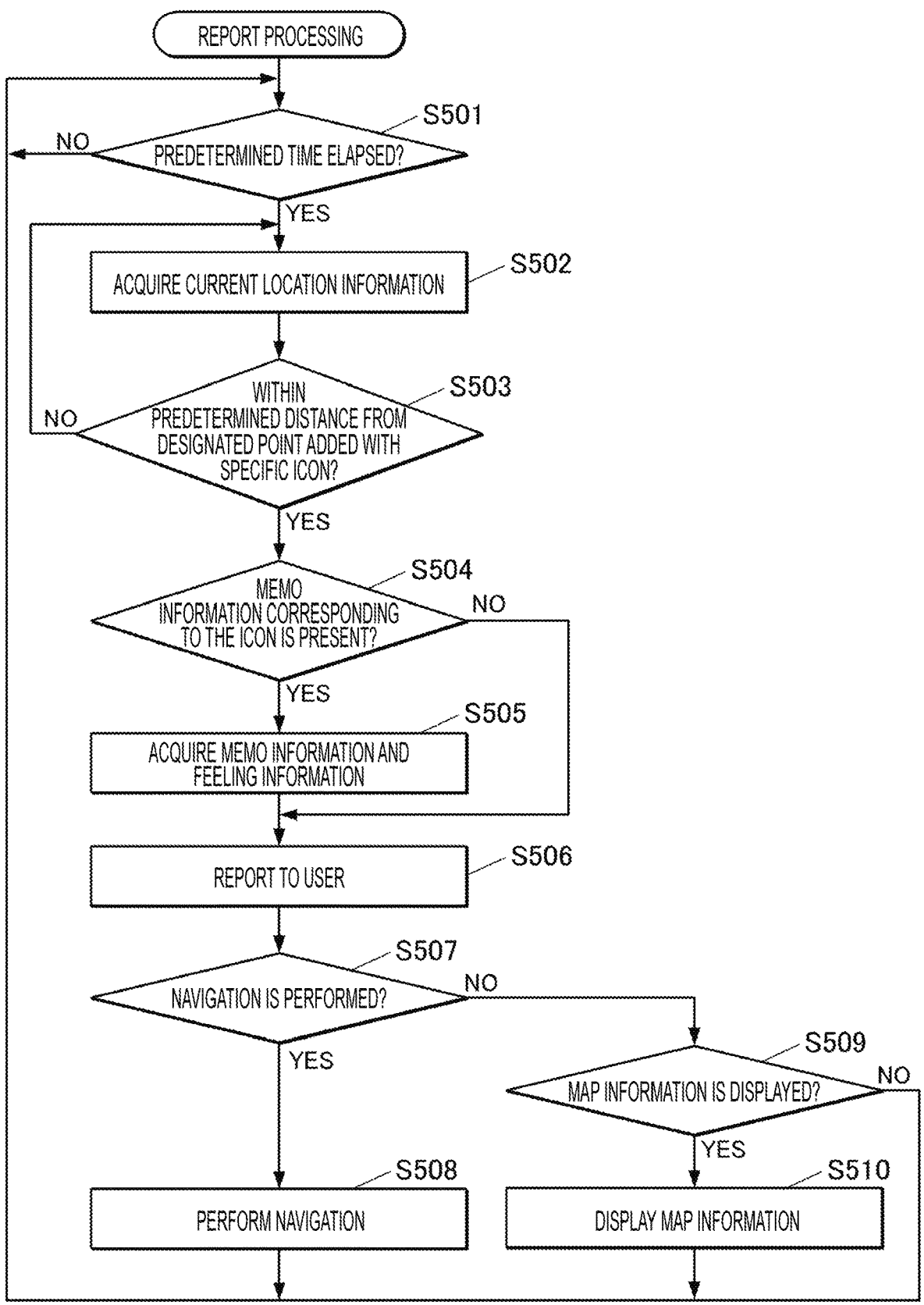
FIG. 20 is a flowchart illustrating an exemplary report processing according to the variant 1.

The report processing performed by the map information display system according to the variant 1 or the smartwatch 1 will be subsequently described with reference to FIG. 20. FIG. 20 is a flowchart illustrating the report processing according to the variant 1 by way of example.

The report processing is repeatedly performed while the power supply of the satellite radiowave reception module 108 in the smartwatch 1 is ON. The report processing is performed only when the specific icon A1 is added onto the map information in the icon addition processing, and is not performed when the specific icon A1 is not added onto the map information. When the specific icons A1 are added onto the map information, the report processing is performed for each of them.

At first, the CPU 101 in the smartwatch 1 determines whether a predetermined time has elapsed since the specific icon A1 was added (step S501). Specifically, the CPU 101 determines whether one or more days have elapsed since the time indicated by the time information on the basis of the time information stored in the storage unit 105 together with the icon, for example.

When determining that the predetermined time has not elapsed (step S501; NO), the CPU 101 performs the processing in step S501 again.

When determining that the predetermined time has elapsed (step S501; YES), the CPU 101 acquires the current location information indicating a current location of the user by the satellite radiowave reception module 108 (step S502).

The CPU 101 then determines whether the current location indicated by the current location information acquired in the processing in step S502 is within a predetermined distance from the designated point added with the specific icon A1, or within a radius of 5 km, for example (step S503). When the feeling information corresponding to the specific icon A1 is stored in the storage unit 105, the CPU 101 changes the distance to be determined on the basis of the feeling information.

When determining that the current location is not within the predetermined distance from the designated point (step S503; NO), the CPU 101 performs the processing in step S502 again.

When determining that the current location is within the predetermined distance from the designated point (step S503; YES), the CPU 101 determines the presence of memo information corresponding to the specific icon A1 added to the designate point (step S504).

When determining that the memo information is present (step S504; YES), the CPU 101 acquires the memo information and its corresponding feeling information from the storage unit 105 (step S505). On the other hand, when determining that the memo information is not present (step S504; NO), the CPU 101 skips the processing in step S505.

The CPU 101 then reports the predetermined information corresponding to the icon to the user (step S506).

The CPU 101 then determines whether to perform navigation (step S507). When determining to perform navigation (step S507; YES), the CPU 101 performs navigation (step S508). After performing navigation, the CPU 101 performs the processing in step S501 again.

On the other hand, when determining not to perform navigation (step S507; NO), the CPU 101 determines whether to display the map information (step S509).

When determining to display the map information (step S509; YES), the CPU 101 causes the display unit 104 to display the map information (step S510). The CPU 101 causes the map information to be displayed, and then performs the processing in step S501 again.

When determining not to display the map information (step S509; NO), the CPU 101 skips the processing in step S510, and performs the processing in step S501 again.

The CPU 101 performs the report processing as described above, and repeatedly reports predetermined information to the user whenever a predetermined condition is satisfied.

(Technical Advantages of Variant 1)

As described above, according to the variant 1, the map information display system is configured of only the smartwatch 1, and thus can remarkably improve convenience since the user does not need to own a smartphone in addition to the technical advantages according to the embodiment.

<<Variant 2>>

A variant 2 of the map information display system 100 according to the embodiment will be described. The points other than the following points are similar to the map information display system 100 according to the embodiment.

The map information display system according to the variant 2 is different from the map information display system 100 according to the embodiment in the following points. That is, an icon addition processing is performed as follows and an icon is selected on the basis of input speech in the map information display system according to the variant 2. Thus, not only the specific icon A1 but also comment information corresponding to any icon is stored according to the variant 2. Therefore, even when an icon added onto the map information is not the specific icon A1, the report processing is performed. A map information display processing according to the variant 2 is similar to the map information display processing according to the embodiment, and a report processing according to the variant 2 is similar to the report processing according to the embodiment except that icons other than the specific icon A1 are also reported.

(Icon Addition Processing)

Figure 21:
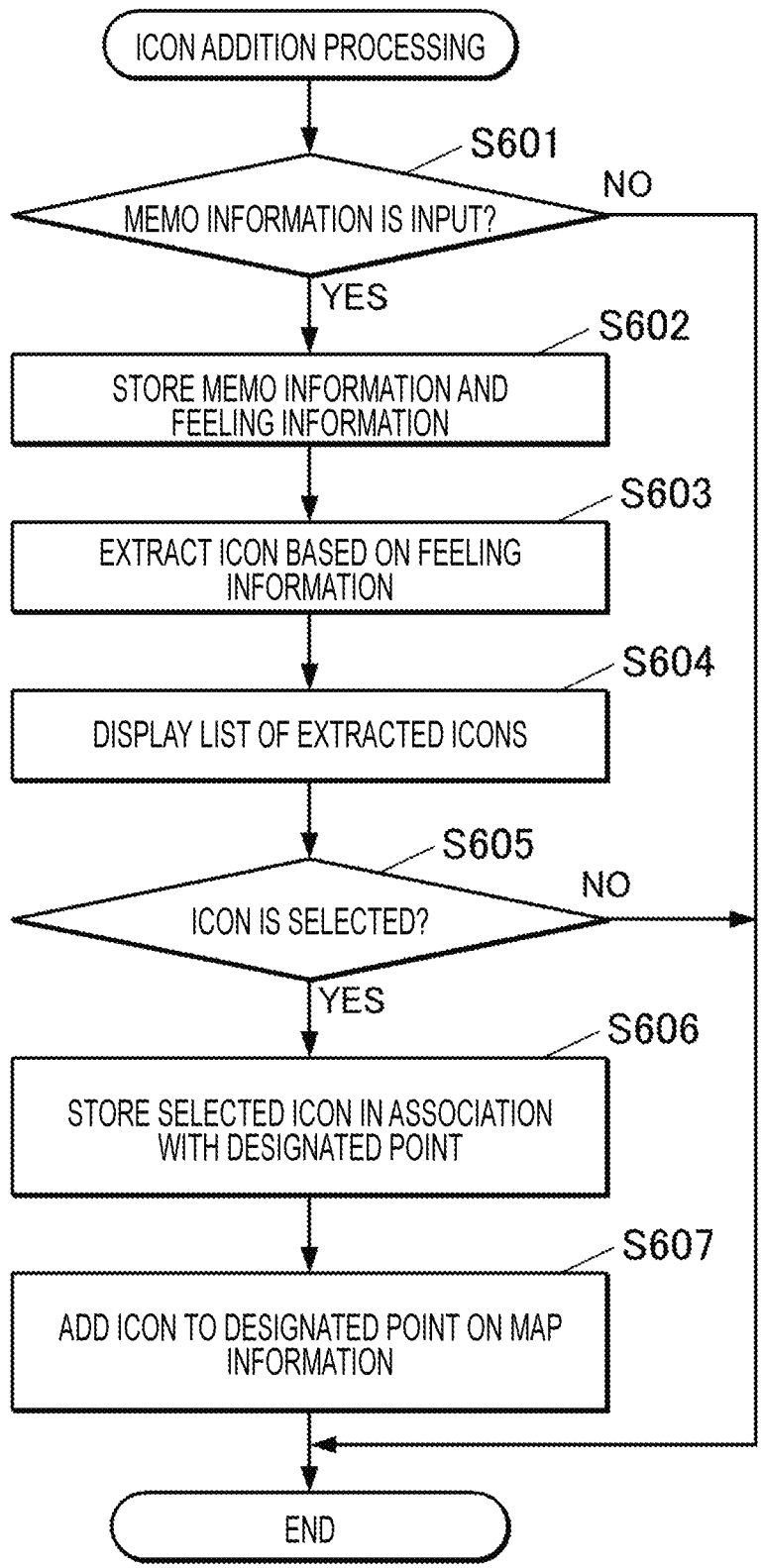
FIG. 21 is a flowchart illustrating an exemplary icon addition processing according to a variant 2.

The icon addition processing according to the variant 2 will be described with reference to FIG. 21. FIG. 21 is a flowchart illustrating the icon addition processing according to the variant 2 by way of example. The points other than the following points are assumed to be performed similarly to the icon addition processing according to the embodiment.

As illustrated in FIG. 21, the CPU 101 in the smartwatch 1 first determines whether memo information has been input as information corresponding to an icon (step S601).

Specifically, when the speech standby screen G7c illustrated in FIG. 7C is displayed on the display unit 104 and the user inputs his/her speech, the CPU 101 determines that memo information has been input. When the user gives his/her voice toward the smartwatch 1, the speech is input via the microphone of the operation input unit 102. For example, when speech is not input for a predetermined time while the speech standby screen G7c is being displayed, the CPU 101 determines that memo information has not been input.

When determining that memo information has been input (step S601; YES), the CPU 101 converts the input speech into a character string, and causes the storage unit 105 to store the character string as memo information, and acquires feeling information based on the input speech and causes the storage unit 105 to store the feeling information (step S602).

When determining that memo information has not been input (step S601; NO), the CPU 101 terminates the icon addition processing.

The CPU 101 then extracts any one or more icons from among the different icons on the basis of the acquired feeling information (step S603). Specifically, the CPU 101 extracts a plurality of icons suitable for user's feeling indicated by the feeling information. For example, when the feeling information indicates "hard/angry," an icon A4, A6 (see FIG. 10) or the like is extracted, when the feeling information indicates "anxious," an icon A3, A6 (see FIG. 10) or the like is extracted, when the feeling information indicates "steady," an icon A5 (see FIG. 10) or the like is extracted, and when the feeling information indicates "happy," an icon A2, A5 (see FIG. 10) or the like is extracted.

As illustrated in FIG. 21, the CPU 101 then causes the display unit 104 to display a list of icons extracted in the processing in step S603 (step S604). For example, the CPU 101 causes the display unit 104 to display the extracted icons as illustrated in FIG. 7B.

As illustrated in FIG. 21, the CPU 101 then determines whether the user has selected an icon (step S605). Specifically, when the icon decision button P73 is tapped (or the press button switch 102a is pressed) by the user while the extracted icons are being displayed on the display unit 104 as illustrated in FIG. 7B, the CPU 101 determines that an icon has been selected. When a user operation is not input for a predetermined time or the press button switch 102b is pressed while the extracted icons are being displayed, the CPU 101 determines that an icon has not been selected.

When determining that an icon has not been selected (step S605; NO), the CPU 101 terminates the icon addition processing.

When determining that an icon has been selected (step S605; YES), the CPU 101 causes the storage unit 105 to store the user-selected icon in association with the designated point information indicating a designated point assuming the current location as the designated point (step S606). At this time, the CPU 101 counts a current time by the timer unit 107 and acquires time information, and causes the storage unit 105 to store the time information together with the selected icon.

The CPU 101 then causes the storage unit 105 to store the information, and then causes the display unit 104 to display the screen in which the selected icon is added to the current location (designated point) on the map information (step S607). Here, the CPU 101 causes the display unit 104 to display the selected icon in a changed color tone on the basis of the feeling information stored in the storage unit 105. More specifically, the CPU 101 changes the color tone of the specific icon A1 in red for the feeling information of "hard/angry," in blue for the feeling information of "anxious," in green for the feeling information of "steady," and in yellow for the feeling information of "happy."

When the selected icon is tapped by the user while the screen in which the selected icon is added is being displayed, the CPU 101 causes the display unit 104 to display a character string as memo information. In this case, the CPU 101 may cause the display unit 104 to display the character string in a changed display form on the basis of the feeling information stored together with the memo information.

The icon addition processing is performed as described above.

The processing in step S603 is assumed to extract a plurality of icons, but is not limited thereto, and may be assumed to extract only one icon. When only one icon is to be extracted, the CPU 101 skips the processings in steps S604 and S605, and selects the extracted icon.

(Technical Advantages of Variant 2)

As described above, according to the variant 2, the CPU 101 selects any icon on the basis of acquired feeling information, and thus the user can add an icon matching with his/her feeling onto map information only by speech input in addition to the technical advantages according to the embodiment.

The CPU 101 extracts any one or more icons from among the different icons on the basis of the acquired feeling information, and selects a user-selected icon among the extracted icons, thereby adding an icon more suitable for user's feeling or situation onto the map information.

(Others)

The embodiment and the variants 1 and 2 describe a suitable map information display system according to the present invention by way of example, but are not limited thereto. In particular, various images displayed on the display unit 104 in the smartwatch 1 are exemplary, and are not limited thereto.

For example, the variant 1 assumes that the map information display system is configured of only the smartwatch 1, but is not limited thereto. That is, the map information display system may not comprise the smartwatch 1 and may be configured of only the smartphone 2. In this case, the smartphone 2 performs alone various processings such as the map information display processing, the icon addition processing, and the report processing.

The embodiment and the variants 1 and 2 assume that a user-added icon, designated point information indicating a designated point added with the icon, time information indicating when the icon is added, and user-input memo information are stored in the storage unit 105 in the smartwatch 1, but are not limited thereto. For example, the information may be stored in the storage unit 205 in the smartphone 2, or may be stored in an external device capable of exchanging data with the smartwatch 1 or the smartphone 2. When the information is stored in the storage unit 205 in the smartphone 2, the smartwatch 1 may only display various screens or input operations, and the smartphone 2 may perform various processings such as the map information display processing, the icon addition processing, and the report processing.

Further, after the information is stored in the storage unit 105, the CPU 101 in the smartwatch 1 may transmit data files including the information to an external terminal (such as the smartphone 2) by the communication unit 106 in response to a user operation. Thereby, the user can browse the past-added icons and the like by the external terminal, thereby improving convenience. The data files may be in any form capable of being read by the external terminal, such as a form capable of being arranged on a map service such as Keyhole Markup Language (kml) format. When the information unique to the smartwatch 1 (such as designs of icons) is included in the data files, the external terminal as transmission destination needs to have a dedicated application for reading and reproducing the information on a map service, and may not completely reproduce. Thus, such unique information itself is not included in the data files, and URL for accessing a predetermined server (not illustrated) storing the information therein is preferably included. Thereby, even when the external terminal does not have a dedicated application, the external terminal can access a predetermined server on a communication network on the basis of the acquired URL thereby to acquire and reproduce the information previously stored in the predetermined server on a map service. The data files may further include a history of user's current location information, user's moving speed, and results of user-done activities (such as total time, distance, speed, and fishing). The data files may be configured on a daily basis or in units of user-done activity.

The embodiment and the variant 1 assume that the CPU 101 analyzes input speech and acquires feeling information indicating a user's feeling, but are not limited thereto, and feeling information may not be acquired from input speech. In this case, a display form of an icon added in the icon addition processing may not be changed on the basis of the feeling information, a predetermined condition (such as elapsed time since an icon is added to a designated point, or distance range from a designated point) for an icon in the report processing may not be changed on the basis of the feeling information, or a display form of predetermined information (such as icon and memo information to be reported) corresponding to an icon in the report processing may not be changed on the basis of the feeling information. The CPU 101 may switch whether to acquire feeling information based on input speech in response to a user operation.

The embodiment and the variants 1 and 2 assume that the CPU 101 acquires feeling information from user-input speech, but are not limited thereto. For example, the CPU 101 may acquire user information except speech, such as user heart rate or behavior history, and may acquire feeling information on the basis of the information.

The embodiment and the variants 1 and 2 assume that a display form of an icon or character string is changed and a predetermined condition for an icon is changed in the report processing on the basis of the acquired feeling information, but are not limited thereto. That is, a display form of an icon may not be changed, a display form of a character string may not be changed, or a predetermined condition for an icon may not be changed in the report processing. The CPU 101 may switch whether to perform the operation in response to a user operation.

The embodiment and the variants 1 and 2 assume that the feeling information indicates four feelings of the user such as "hard/angry," "anxious," "steady," and "happy," but are not limited thereto. For example, the feeling information may indicate two or three types of feelings of the user out of the four, or may indicate five or more types of feelings of the user including other feelings.

The embodiment and the variants 1 and 2 assume that the CPU 101 causes the display unit 104 to display an icon in a changed color tone depending on the feeling information, but are not limited thereto if a display form of an icon is changed on the basis of the feeling information. For example, the CPU 101 may cause the display unit 104 to display an icon in a changed type or size on the basis of the feeling information. In this case, when the feeling information indicates "hard/angry" or "anxious," a type of an icon may be changed to a form associated with the feeling or a size of an icon may be relatively decreased. When the feeling information indicates "steady" or "happy," a type of an icon may be changed to a form associated with the feeling, or a size of an icon may be relatively increased.

The embodiment and the variants 1 and 2 assume that predetermined conditions for reporting predetermined information to the user are that a distance from a designated point to a current location is within a predetermined distance and an elapsed time since an icon is added to the designated point is a predetermined time or more, but are not limited thereto. That is, the predetermined conditions for reporting predetermined information to the user may be any conditions as long as the predetermined condition consists of only a condition that a designated point is within a range displayable on the display unit 104 depending on a current location. For example, predetermined information may be reported to the user on the basis of a time when an icon is added to a designated point. In this case, the CPU 101 may report predetermined information to the user when counting a current time at a predetermined timing by the timer unit 107 and acquiring time information, and satisfying the condition that the current time is ±certain time of the time when the icon is added to the designated point. Thereby, when predetermined information corresponding to an icon is valid only in a specific time zone, only in a case where a current time is in the specific time zone, the fact can be reported to the user. Thus, it is possible to prevent information from being frequently reported to the user, and to improve convenience.

Further, predetermined information may be reported to the user in one of or in a combination of two or more of a distance from a designated point to a current location, an elapsed time since an icon is added to a designated point, and a time when an icon is added to a designated point.

The conditions may be previously set in association with user-selected icons.

Furthermore, the CPU 101 may change the conditions on the basis of the feeling information acquired from input speech.

The embodiment and the variants 1 and 2 assume that a display form of a character string corresponding to an icon is changed on the basis of the feeling information, but are not limited thereto. For example, when the user transmits a message or the like made of a character string to other terminal by speech input, the CPU 101 may acquire the feeling information from the speech, and may cause the display unit 104 to display the message or the like in a changed display form on the basis of the acquired feeling information. When a terminal to which the message or the like is to be transmitted is configured similarly to the smartwatch 1, the CPU 101 may cause the display unit 104 to display the received message or the like in a changed display form on the basis of the feeling information.

The embodiment and the variants 1 and 2 assume that information corresponding to an icon is user-input memo information, but are not limited thereto. For example, if predetermined information is previously associated with a user-selected icon and a predetermined condition is satisfied without user' inputting memo information, the predetermined information may be reported.

The embodiment and the variants 1 and 2 assume that memo information is input by user's speech, but are not limited thereto, and memo information may be manually input. For example, user-shot photos, user-drawn images, user-selected format, and the like may be manually input as memo information.

The embodiment and the variants 1 and 2 assume that the CPU 101 reports map information indicating a designated point together with memo information, but are not limited thereto and may assume that only memo information is reported.

The embodiment and the variants 1 and 2 assume that the CPU 101 reports memo information to the user and then performs navigation to a designated point on the basis of current location information and map information, but are not limited thereto and may assume that navigation is not performed.

The embodiment and the variant 1 assume that the CPU 101 reports only predetermined information corresponding to the specific icon A1 among the different icons, but are not limited thereto and may assume that predetermined information corresponding to other icons A2 to A10 is reported. In this case, memo information corresponding to the icons A2 to A10 may be input.

The embodiment and the variants 1 and 2 assume that the screen G14a is displayed on the display unit 104 and predetermined information is reported to the user when a predetermined condition is satisfied, but are not limited thereto. For example, the CPU 101 may display the screen G14a and may output speech or vibration by the output unit 109. When input speech is stored as memo information in the storage unit 105 without being converted into a character string, the CPU 101 may cause the screen G14a not to display therein the memo information display region P141, or may cause the screen G14a to display therein a button or the like for causing the user to select reproducing speech stored as memo information. Predetermined information may be output as speech, video or sheet to an external device other than the map information display system 100, such as music player, head-mount display, or printer thereby to be reported to the user.

The embodiment and the variants 1 and 2 assume that when predetermined information corresponding to the specific icon A1 is reported to the user, navigation from a current location to a designated point is performed in response to a user operation, but are not limited thereto. That is, for example, when an icon past-added by the user or an icon indicating speech input, which is displayed on the map information, is tapped by the user in the map information display processing, a selection screen for causing the user to determine whether to perform navigation from a current location to a point added with the icon may be displayed on the display unit 104.

The embodiment and the variants 1 and 2 assume that the smartwatch 1 has the function of displaying a list of dates when the user past added icons, but are not limited thereto. For example, the smartwatch 1 may have a function of searching an icon past-added by the user, or memo information.

The embodiment and the variants 1 and 2 assume that the CPU 201 in the smartphone 2 acquires current location information indicating a current location of the user by the satellite radiowave reception module 208 or the CPU 101 in the smartwatch 1 acquires current location information indicating a current location of the user by the satellite radiowave reception module 108, but are not limited thereto and may of course assume that current location information is acquired by network location information such as indoor location technique.

The embodiment discloses an example in which a hard disk or semiconductor nonvolatile memory is used as computer-readable medium for the program according to the present invention, but is not limited to the example. A portable recording medium such as CD-ROM can be applied as other computer-readable medium. Further, a carrier wave is also applicable as medium for providing data of the program according to the present invention via a communication line.

Some embodiments of the present invention have been described, but the scope of the present invention is not limited to the embodiments, and encompasses the scope of the invention described in what is claimed is, and its equivalent scope.

What is claimed is:

1. An electronic device comprising a processor configured to:
   acquire current location information;
   acquire map information based on the current location information;
   select an item of additional information from among a plurality of items of additional information, wherein each of the plurality of items of additional information is associated with a respective item of predetermined information, and wherein the plurality of items of additional information are different from each other;
   add the selected item of additional information to a designated point on the map information, the designated point being a point on the map information that corresponds to a current location of the electronic device as indicated by the acquired current location information;
   display, at a first timing, the selected item of additional information and its corresponding designated point together with the map information; and
   report, to a user, at a second timing later than the first timing and in a different form than as displayed in the display, the respective item of predetermined information corresponding to the selected item of additional information added to the designated point when a predetermined condition is satisfied, the predetermined condition being a condition that at least a predetermined threshold amount of time has elapsed since a timing at which the selected item of additional information is added to the designated point.

2. The electronic device according to claim 1, wherein the different form is a form with a higher report effect than as displayed in the display.

3. The electronic device according to claim 1, wherein the processor is further configured to again report the respective item of predetermined information corresponding to the selected item of additional information to the user when the predetermined condition is satisfied again after initially reporting the respective item of predetermined information corresponding to the selected item of additional information.

4. The electronic device according to claim 1, wherein the processor is further configured to, when the user moves and approaches the designated point, report the respective item of predetermined information corresponding to the selected item of additional information in a different form than a form in which the selected item of additional information itself added onto the map information is displayed.

5. The electronic device according to claim 1, wherein the processor is further configured to, when the current location indicated by the current location information is within a predetermined distance from the designated point, report the respective item of predetermined information corresponding to the selected item of additional information to the user.

6. The electronic device according to claim 1, wherein the processor is further configured to determine whether a report permission condition for permitting the respective item of predetermined information to be reported to the user is satisfied, and when determining that the report permission condition is satisfied, to permit reporting of the respective item of predetermined information to the user.

7. The electronic device according to claim 6, wherein the processor is further configured to permit reporting the respective item of predetermined information to the user based on a moving distance after the selected item of additional information is added to the designated point.

8. The electronic device according to claim 6, wherein the processor is further configured to, when determining that a state in which the predetermined condition is satisfied changes to a state in which the predetermined condition is not satisfied, permit reporting of the respective item of predetermined information to the user.

9. The electronic device according to claim 1, wherein the processor is further configured to display the map information indicating the designated point.

10. The electronic device according to claim 1, wherein the processor is further configured to display a list of items of additional information added to the designated point in time series based on times at which the items of additional information are added to the designated point.

11. The electronic device according to claim 1, wherein the processor is further configured to report only predetermined information corresponding to a specific item of additional information from among the plurality of items of different additional information.

12. The electronic device according to claim 1, wherein the processor is further configured to:
    present at least one item of additional information from among the plurality of items of different additional information, and
    display a list of at least two items of additional information from among the plurality of items of different additional information such that the item of additional information most recently selected by the user, from among the at least two items of additional information, is arranged at a beginning of the list.

13. The electronic device according to claim 1, wherein the processor is further configured to add additional information indicating a user-selected location on the map information as the designated point.

14. The electronic device according to claim 1, wherein the processor is further configured to:
    acquire feeling information indicating a feeling of the user; and
    control at least one of the selected item of additional information and the respective item of predetermined information corresponding to the selected item of additional information based on the feeling information.

15. The electronic device according to claim 14, wherein the processor is further configured to select an item of the additional information based on the feeling information.

16. The electronic device according to claim 14, wherein the processor is further configured to add the selected item of additional information in a display form that is modified based on the feeling information.

17. The electronic device according to claim 1, wherein the predetermined threshold amount of time is two hours.

18. The electronic device according to claim 1, wherein the first timing is the timing at which the selected item of additional information is added to the designated point.

19. A non-transitory computer-readable recording medium storing a program for causing a computer, when executed on a processor, to perform processes comprising:
acquiring current location information;
acquiring map information based on the current location information;
selecting an item of additional information from among a plurality of items of additional information, wherein each of the plurality of items of additional information is associated with a respective item of predetermined information, and wherein the plurality of items of additional information are different from each other;
adding the selected item of additional information to a designated point on the map information, the designated point being a point on the map information that corresponds to a current location of the electronic device as indicated by the acquired current location information;
displaying, at a first timing, the selected item of additional information and its corresponding designated point together with the map information; and
reporting, to a user, at a second timing later than the first timing and in a different form than as displayed in the display, the respective item of predetermined information corresponding to the selected item of additional information added to the designated point when a predetermined condition is satisfied, the predetermined condition being a condition that at least a predetermined threshold amount of time has elapsed since a timing at which the selected item of additional information is added to the designated point.

20. An information report method performed by a processor of an electronic device, the method comprising:
acquiring current location information;
acquiring map information based on the current location information;
selecting an item of additional information from among a plurality of items of additional information, wherein each of the plurality of items of additional information is associated with a respective item of predetermined information, and wherein the plurality of items of additional information are different from each other;
adding, at a first timing, the selected item of additional information to a designated point on the map information, the designated point being a point on the map information that corresponds to a current location of the electronic device as indicated by the acquired current location information; and
reporting, to a user at a second timing later than the first timing and in a different from than as displayed in the display, the respective item of predetermined information corresponding to the selected item of additional information added to the designated point when a predetermined condition is satisfied, the predetermined condition being a condition that at least a predetermined threshold amount of time has elapsed since a timing at which the selected item of additional information is added to the designated point.

* * * * *

UNITED STATES PATENT AND TRADEMARK OFFICE
CERTIFICATE OF CORRECTION

PATENT NO. : 11,137,725 B2
APPLICATION NO. : 15/721564
DATED : October 5, 2021
INVENTOR(S) : Imamura Page 1 of 1

It is certified that error appears in the above-identified patent and that said Letters Patent is hereby corrected as shown below:

In the Claims

Column 30, Line 22 (Claim 20), delete "from" and insert --form--.

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*